United States Patent
Reed et al.

(10) Patent No.: US 8,094,869 B2
(45) Date of Patent: *Jan. 10, 2012

(54) FRAGILE AND EMERGING DIGITAL WATERMARKS

(75) Inventors: Alastair M. Reed, Lake Oswego, OR (US); Tony F. Rodriguez, Portland, OR (US); Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1525 days.

This patent is subject to a terminal disclaimer.

(21) Appl. No.: 10/836,094

(22) Filed: Apr. 29, 2004

(65) Prior Publication Data

US 2005/0041835 A1    Feb. 24, 2005

Related U.S. Application Data

(63) Continuation-in-part of application No. 10/823,514, filed on Apr. 12, 2004, now Pat. No. 7,027,614, which is a continuation of application No. 09/898,901, filed on Jul. 2, 2001, now Pat. No. 6,721,440.

(60) Provisional application No. 60/466,926, filed on Apr. 30, 2003.

(51) Int. Cl.
*G06K 9/00* (2006.01)
*H04L 9/32* (2006.01)

(52) U.S. Cl. .................................. 382/100; 713/176
(58) Field of Classification Search .................. 382/100, 382/135–137; 283/94; 399/366; 235/454, 235/468, 472, 491; 358/1.9, 1.14; 380/238; 713/176

See application file for complete search history.

(56) References Cited

U.S. PATENT DOCUMENTS 2,748,190 A    5/1956  Yule
4,504,084 A    3/1985  Jauch
(Continued)

FOREIGN PATENT DOCUMENTS

DE    2943436    5/1981
(Continued)

OTHER PUBLICATIONS

Battiato el al, "Robust Watermarking for Images Based on Color Manipulation", http://www.dmi.unict.it/<battiato/download/LNCSWatermark2000.pdf>.*

(Continued)

*Primary Examiner* — Gregory M Desire
*Assistant Examiner* — Andrae S Allison

(57) ABSTRACT

This disclosure describes methods for using embedded auxiliary signals in documents for copy detection. In one implementation we embed an auxiliary signal with a first color that is out of gamut with process color inks or with a particular range of printers. A process color approximation of the first color yields a relatively different contrast when, e.g., viewed with an interference filter. A copy is determined based on the relative presence or absence of the auxiliary signal. In another implementation, we provide a first auxiliary signal with a first color and a second auxiliary signal with a second color. A filter is matched according to the spectral response of the first color. The second color preferably includes a spectral response that is inversely related to the matched filter. The first signal is then detectable in a process color copy, but less so in the original. However, the second signal is detectable in the original, but less so in the copy. In still other implementations we compare relative contrast of a signal to determine an original from a copy.

19 Claims, 34 Drawing Sheets

U.S. PATENT DOCUMENTS

| | | | |
|---|---|---|---|
| 4,725,462 A | 2/1988 | Kimura | |
| 4,739,377 A | 4/1988 | Allen | |
| 4,884,828 A | 12/1989 | Burnham et al. | |
| 5,005,873 A | 4/1991 | West | |
| 5,051,835 A | 9/1991 | Bruehl et al. | |
| 5,074,596 A | 12/1991 | Castagnoli | |
| 5,093,147 A | 3/1992 | Andrus et al. | |
| 5,291,243 A | 3/1994 | Heckman et al. | |
| 5,315,098 A | 5/1994 | Tow | |
| 5,337,361 A | 8/1994 | Wang et al. | |
| 5,385,371 A | 1/1995 | Izawa | |
| 5,396,559 A | 3/1995 | McGrew | |
| 5,458,713 A | 10/1995 | Ojster | |
| 5,481,377 A | 1/1996 | Udagawa et al. | |
| 5,481,378 A | 1/1996 | Sugano et al. | |
| 5,488,664 A | 1/1996 | Shamir | |
| 5,502,304 A * | 3/1996 | Berson et al. | 250/271 |
| 5,521,722 A | 5/1996 | Colvill et al. | |
| 5,525,798 A * | 6/1996 | Berson et al. | 250/271 |
| 5,530,751 A | 6/1996 | Morris | |
| 5,530,759 A | 6/1996 | Braudaway et al. | |
| 5,548,106 A * | 8/1996 | Liang et al. | 235/454 |
| 5,557,412 A | 9/1996 | Saito et al. | |
| 5,568,555 A | 10/1996 | Shamir | |
| 5,617,119 A | 4/1997 | Briggs et al. | |
| 5,636,874 A | 6/1997 | Singer | |
| 5,646,997 A | 7/1997 | Barton | |
| 5,652,626 A | 7/1997 | Kawakami et al. | |
| 5,661,574 A | 8/1997 | Kawana | |
| 5,687,236 A | 11/1997 | Moskowitz et al. | |
| 5,687,297 A | 11/1997 | Coonan et al. | |
| 5,689,623 A | 11/1997 | Pinard | |
| 5,696,594 A | 12/1997 | Saito et al. | |
| 5,710,834 A | 1/1998 | Rhoads | |
| 5,721,788 A | 2/1998 | Powell et al. | |
| 5,722,693 A | 3/1998 | Wicker | |
| 5,734,752 A | 3/1998 | Knox | |
| 5,748,763 A | 5/1998 | Rhoads | |
| 5,760,386 A | 6/1998 | Ward | |
| 5,781,653 A | 7/1998 | Okubo | |
| 5,787,186 A | 7/1998 | Schroeder | |
| 5,788,285 A | 8/1998 | Wicker | |
| 5,790,693 A | 8/1998 | Graves et al. | |
| 5,790,703 A | 8/1998 | Wang | |
| 5,809,139 A | 9/1998 | Girod et al. | |
| 5,822,436 A | 10/1998 | Rhoads | |
| 5,824,447 A | 10/1998 | Tavernier et al. | |
| 5,825,892 A | 10/1998 | Braudaway et al. | |
| 5,832,119 A | 11/1998 | Rhoads | |
| 5,832,186 A | 11/1998 | Kawana | |
| 5,841,886 A | 11/1998 | Rhoads | |
| 5,841,978 A | 11/1998 | Rhoads | |
| 5,862,218 A | 1/1999 | Steinberg | |
| 5,862,260 A | 1/1999 | Rhoads | |
| 5,875,249 A | 2/1999 | Mintzer et al. | |
| 5,893,101 A | 4/1999 | Balogh et al. | |
| 5,905,800 A | 5/1999 | Moskowitz et al. | |
| 5,905,819 A * | 5/1999 | Daly | 382/284 |
| 5,915,027 A | 6/1999 | Cox et al. | |
| 5,918,960 A * | 7/1999 | Hopwood et al. | 356/71 |
| 5,919,730 A | 7/1999 | Gasper et al. | |
| 5,930,369 A | 7/1999 | Cox et al. | |
| 5,933,798 A | 8/1999 | Linnartz | |
| 5,946,414 A | 8/1999 | Cass et al. | |
| 5,949,055 A | 9/1999 | Fleet et al. | |
| 5,951,055 A | 9/1999 | Mowry, Jr. | |
| 5,960,081 A | 9/1999 | Vynne et al. | |
| 5,960,103 A * | 9/1999 | Graves et al. | 382/135 |
| 5,974,548 A | 10/1999 | Adams | |
| 5,978,013 A | 11/1999 | Jones et al. | |
| 5,995,638 A | 11/1999 | Amidror et al. | |
| 6,014,453 A | 1/2000 | Sonoda et al. | |
| 6,045,656 A | 4/2000 | Foster et al. | |
| 6,046,808 A | 4/2000 | Fateley | |
| 6,054,021 A | 4/2000 | Kurrle et al. | |
| 6,064,764 A | 5/2000 | Bhaskaran et al. | |
| 6,091,844 A | 7/2000 | Fujii et al. | |
| 6,094,483 A | 7/2000 | Fridrich et al. | |
| 6,104,812 A | 8/2000 | Koltai et al. | |
| 6,115,494 A | 9/2000 | Sonoda et al. | |
| 6,120,882 A | 9/2000 | Faykish et al. | |
| 6,122,403 A | 9/2000 | Rhoads | |
| 6,128,411 A | 10/2000 | Knox | |
| 6,136,752 A | 10/2000 | Paz-Pujalt et al. | |
| 6,183,018 B1 | 2/2001 | Braun | |
| 6,185,312 B1 | 2/2001 | Nakamura et al. | |
| 6,185,683 B1 | 2/2001 | Ginter et al. | |
| 6,192,138 B1 | 2/2001 | Yamadaji | |
| 6,198,545 B1 | 3/2001 | Ostromoukhov et al. | |
| 6,201,879 B1 | 3/2001 | Bender et al. | |
| 6,229,924 B1 | 5/2001 | Rhoads et al. | |
| 6,233,347 B1 | 5/2001 | Chen et al. | |
| 6,233,684 B1 | 5/2001 | Stefik et al. | |
| 6,234,537 B1 * | 5/2001 | Gutmann et al. | 283/86 |
| 6,246,777 B1 | 6/2001 | Agarwal et al. | |
| 6,263,438 B1 | 7/2001 | Walker et al. | |
| 6,272,176 B1 | 8/2001 | Srinivasan | |
| 6,272,248 B1 | 8/2001 | Saitoh et al. | |
| 6,272,634 B1 | 8/2001 | Tewfik et al. | |
| 6,275,599 B1 | 8/2001 | Adler et al. | |
| 6,281,165 B1 | 8/2001 | Cranford | |
| 6,285,775 B1 | 9/2001 | Wu et al. | |
| 6,285,776 B1 | 9/2001 | Rhoads | |
| 6,304,345 B1 | 10/2001 | Patton et al. | |
| 6,307,949 B1 | 10/2001 | Rhoads | |
| 6,311,214 B1 | 10/2001 | Rhoads | |
| 6,314,192 B1 | 11/2001 | Chen et al. | |
| 6,320,675 B1 | 11/2001 | Sakaki et al. | |
| 6,328,209 B1 | 12/2001 | O'Boyle | |
| 6,332,031 B1 | 12/2001 | Rhoads et al. | |
| 6,332,194 B1 | 12/2001 | Bloom et al. | |
| 6,334,187 B1 | 12/2001 | Kadono | |
| 6,345,104 B1 | 2/2002 | Rhoads | |
| 6,356,363 B1 | 3/2002 | Cooper et al. | |
| 6,373,965 B1 * | 4/2002 | Liang | 382/112 |
| 6,381,341 B1 | 4/2002 | Rhoads | |
| 6,385,329 B1 | 5/2002 | Sharma et al. | |
| 6,390,362 B1 | 5/2002 | Martin | |
| 6,394,358 B1 | 5/2002 | Thaxton et al. | |
| 6,404,926 B1 | 6/2002 | Miyahara et al. | |
| 6,408,082 B1 | 6/2002 | Rhoads et al. | |
| 6,421,070 B1 | 7/2002 | Ramos et al. | |
| 6,424,725 B1 | 7/2002 | Rhoads et al. | |
| 6,427,020 B1 | 7/2002 | Rhoads | |
| 6,434,322 B1 | 8/2002 | Kimura et al. | |
| 6,438,251 B1 | 8/2002 | Yamaguchi | |
| 6,471,247 B1 | 10/2002 | Hardwick et al. | |
| 6,481,753 B2 | 11/2002 | Van Boom et al. | |
| 6,516,079 B1 | 2/2003 | Rhoads et al. | |
| 6,522,770 B1 | 2/2003 | Seder et al. | |
| 6,535,617 B1 | 3/2003 | Hannigan et al. | |
| 6,542,927 B2 | 4/2003 | Rhoads | |
| 6,553,129 B1 | 4/2003 | Rhoads | |
| 6,567,533 B1 | 5/2003 | Rhoads | |
| 6,580,808 B2 | 6/2003 | Rhoads | |
| 6,590,996 B1 | 7/2003 | Reed et al. | |
| 6,591,009 B1 | 7/2003 | Usami et al. | |
| 6,611,599 B2 | 8/2003 | Natarajan | |
| 6,611,607 B1 * | 8/2003 | Davis et al. | 382/100 |
| 6,614,914 B1 | 9/2003 | Rhoads et al. | |
| 6,636,615 B1 | 10/2003 | Rhoads et al. | |
| 6,647,128 B1 | 11/2003 | Rhoads | |
| 6,647,130 B2 | 11/2003 | Rhoads | |
| 6,650,761 B1 | 11/2003 | Rodriguez et al. | |
| 6,681,028 B2 | 1/2004 | Rhoads et al. | |
| 6,681,029 B1 | 1/2004 | Rhoads | |
| 6,690,811 B2 | 2/2004 | Au et al. | |
| 6,694,042 B2 | 2/2004 | Seder et al. | |
| 6,694,043 B2 | 2/2004 | Seder et al. | |
| 6,700,990 B1 | 3/2004 | Rhoads | |
| 6,700,995 B2 | 3/2004 | Reed | |
| 6,704,869 B2 | 3/2004 | Rhoads et al. | |
| 6,718,046 B2 * | 4/2004 | Reed et al. | 382/100 |
| 6,718,047 B2 | 4/2004 | Rhoads | |
| 6,721,440 B2 | 4/2004 | Reed et al. | |
| 6,728,390 B2 | 4/2004 | Rhoads et al. | |
| 6,744,906 B2 | 6/2004 | Rhoads et al. | |

| Patent No. | Date | Inventor(s) |
|---|---|---|
| 6,751,342 B2 | 6/2004 | Shepard |
| 6,755,441 B2 | 6/2004 | Stenzel et al. |
| 6,760,463 B2 | 7/2004 | Rhoads |
| 6,763,122 B1 | 7/2004 | Rodriguez et al. |
| 6,763,123 B2 | 7/2004 | Reed et al. |
| 6,768,809 B2 | 7/2004 | Rhoads et al. |
| 6,775,392 B1 | 8/2004 | Rhoads |
| 6,782,116 B1 | 8/2004 | Zhao et al. |
| 6,785,815 B1 | 8/2004 | Serret-Avila et al. |
| 6,786,954 B1 | 9/2004 | Lee et al. |
| 6,798,894 B2 | 9/2004 | Rhoads |
| 6,813,366 B1 | 11/2004 | Rhoads |
| 6,817,530 B2 | 11/2004 | Labrec et al. |
| 6,827,277 B2 | 12/2004 | Bloomberg et al. |
| 6,834,344 B1 * | 12/2004 | Aggarwal et al. ............ 713/176 |
| 6,879,701 B1 | 4/2005 | Rhoads |
| 6,917,724 B2 | 7/2005 | Seder et al. |
| 6,920,232 B2 | 7/2005 | Rhoads |
| 6,922,480 B2 | 7/2005 | Rhoads |
| 6,934,344 B2 | 8/2005 | Kazakevich et al. |
| 6,940,995 B2 | 9/2005 | Choi et al. |
| 6,947,571 B1 | 9/2005 | Rhoads et al. |
| 6,970,259 B1 | 11/2005 | Lunt et al. |
| 6,975,746 B2 | 12/2005 | Davis et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,017,045 B1 | 3/2006 | Krishnamachari |
| 7,020,285 B1 | 3/2006 | Kirovski |
| 7,024,016 B2 | 4/2006 | Rhoads et al. |
| 7,027,189 B2 | 4/2006 | Umeda |
| 7,027,614 B2 | 4/2006 | Reed |
| 7,035,427 B2 | 4/2006 | Rhoads |
| 7,040,663 B1 | 5/2006 | Plaschka et al. |
| 7,044,395 B1 | 5/2006 | Rhoads et al. |
| 7,046,808 B1 | 5/2006 | Metois et al. |
| 7,051,086 B2 | 5/2006 | Rhoads et al. |
| 7,054,461 B2 | 5/2006 | Zeller et al. |
| 7,054,465 B2 | 5/2006 | Rhoads |
| 7,062,069 B2 | 6/2006 | Rhoads |
| 7,095,871 B2 | 8/2006 | Jones et al. |
| 7,111,168 B2 | 9/2006 | Lofgren et al. |
| 7,111,170 B2 | 9/2006 | Rhoads et al. |
| 7,113,614 B2 | 9/2006 | Rhoads |
| 7,139,408 B2 | 11/2006 | Rhoads et al. |
| 7,142,689 B2 * | 11/2006 | Hayashi et al. ............ 382/100 |
| 7,143,950 B2 | 12/2006 | Jones et al. |
| 7,158,654 B2 | 1/2007 | Rhoads |
| 7,164,780 B2 | 1/2007 | Brundage et al. |
| 7,171,016 B1 | 1/2007 | Rhoads |
| 7,171,020 B2 | 1/2007 | Rhoads et al. |
| 7,174,031 B2 | 2/2007 | Rhoads et al. |
| 7,177,443 B2 | 2/2007 | Rhoads |
| 7,191,156 B1 | 3/2007 | Seder |
| 7,194,105 B2 | 3/2007 | Hersch et al. |
| 7,201,948 B2 | 4/2007 | Moia et al. |
| 7,213,757 B2 | 5/2007 | Jones et al. |
| 7,224,819 B2 | 5/2007 | Levy et al. |
| 7,248,717 B2 | 7/2007 | Rhoads |
| 7,261,612 B1 | 8/2007 | Hannigan et al. |
| 7,298,864 B2 | 11/2007 | Jones |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,369,678 B2 | 5/2008 | Rhoads |
| 7,377,421 B2 | 5/2008 | Rhoads |
| 7,383,999 B2 | 6/2008 | Bi et al. |
| 7,389,939 B2 | 6/2008 | Jones et al. |
| 7,391,880 B2 | 6/2008 | Reed et al. |
| 7,400,743 B2 | 7/2008 | Rhoads et al. |
| 7,406,214 B2 | 7/2008 | Rhoads et al. |
| 7,412,072 B2 | 8/2008 | Sharma et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,446,891 B2 | 11/2008 | Haas et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,499,566 B2 | 3/2009 | Rhoads |
| 7,502,759 B2 | 3/2009 | Hannigan et al. |
| 7,502,937 B2 | 3/2009 | McKinley et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,539,325 B2 | 5/2009 | Rhoads et al. |
| 7,545,952 B2 | 6/2009 | Brundage et al. |
| 7,564,992 B2 | 7/2009 | Rhoads |
| RE40,919 E | 9/2009 | Rhoads |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 2001/0014169 A1 | 8/2001 | Liang |
| 2001/0020270 A1 | 9/2001 | Yeung et al. |
| 2001/0021144 A1 | 9/2001 | Oshima et al. |
| 2001/0024510 A1 | 9/2001 | Iwamura |
| 2001/0026377 A1 | 10/2001 | Ikegami |
| 2001/0028727 A1 | 10/2001 | Naito et al. |
| 2001/0030759 A1 | 10/2001 | Hayashi et al. |
| 2001/0030761 A1 | 10/2001 | Ideyahma |
| 2001/0033674 A1 | 10/2001 | Chen et al. |
| 2001/0034705 A1 | 10/2001 | Rhoads et al. |
| 2001/0037313 A1 | 11/2001 | Lofgren et al. |
| 2001/0037455 A1 | 11/2001 | Lawandy et al. |
| 2001/0040980 A1 | 11/2001 | Yamaguchi |
| 2001/0047478 A1 | 11/2001 | Mase |
| 2001/0052076 A1 | 12/2001 | Kadono |
| 2001/0053235 A1 | 12/2001 | Sato |
| 2001/0054644 A1 | 12/2001 | Liang |
| 2001/0055407 A1 | 12/2001 | Rhoads |
| 2002/0009208 A1 | 1/2002 | Alattar et al. |
| 2002/0015509 A1 | 2/2002 | Nakamura et al. |
| 2002/0018879 A1 | 2/2002 | Barnhart et al. |
| 2002/0021824 A1 | 2/2002 | Reed et al. |
| 2002/0023218 A1 | 2/2002 | Lawandy et al. |
| 2002/0027612 A1 | 3/2002 | Brill et al. |
| 2002/0027674 A1 | 3/2002 | Tokunaga et al. |
| 2002/0031240 A1 | 3/2002 | Levy et al. |
| 2002/0031241 A1 | 3/2002 | Kawaguchi et al. |
| 2002/0037093 A1 | 3/2002 | Murphy |
| 2002/0040433 A1 | 4/2002 | Kondo |
| 2002/0054355 A1 | 5/2002 | Brunk |
| 2002/0054692 A1 | 5/2002 | Suzuki et al. |
| 2002/0057431 A1 | 5/2002 | Fateley et al. |
| 2002/0061121 A1 | 5/2002 | Rhoads et al. |
| 2002/0061122 A1 | 5/2002 | Fujihara et al. |
| 2002/0067844 A1 | 6/2002 | Reed et al. |
| 2002/0073317 A1 | 6/2002 | Hars |
| 2002/0076082 A1 | 6/2002 | Arimura et al. |
| 2002/0080396 A1 | 6/2002 | Silverbrook et al. |
| 2002/0080959 A1 | 6/2002 | Wellner |
| 2002/0095577 A1 | 7/2002 | Nakamura et al. |
| 2002/0099943 A1 | 7/2002 | Rodriguez et al. |
| 2002/0106102 A1 | 8/2002 | Au et al. |

| | | |
|---|---|---|
| 2002/0114456 A1 | 8/2002 | Sako |
| 2002/0118394 A1 | 8/2002 | Mckinley et al. |
| 2002/0126842 A1 | 9/2002 | Hollar |
| 2002/0131076 A1 | 9/2002 | Davis |
| 2002/0144130 A1 | 10/2002 | Rosner et al. |
| 2002/0150246 A1 | 10/2002 | Ogino |
| 2002/0163633 A1 | 11/2002 | Cohen |
| 2002/0171853 A1 | 11/2002 | Wu |
| 2002/0176003 A1 | 11/2002 | Seder et al. |
| 2002/0176114 A1 | 11/2002 | Zeller et al. |
| 2002/0176600 A1 | 11/2002 | Rhoads et al. |
| 2002/0178368 A1 | 11/2002 | Yin et al. |
| 2002/0180995 A1 | 12/2002 | Yen et al. |
| 2002/0181732 A1 | 12/2002 | Safavi-Naini et al. |
| 2002/0186886 A1 | 12/2002 | Rhoads |
| 2002/0196272 A1 | 12/2002 | Ramos et al. |
| 2003/0005304 A1 | 1/2003 | Lawandy et al. |
| 2003/0012562 A1 | 1/2003 | Lawandy et al. |
| 2003/0026453 A1 | 2/2003 | Bradley et al. |
| 2003/0032033 A1 | 2/2003 | Anglin et al. |
| 2003/0033529 A1 | 2/2003 | Ratnakar et al. |
| 2003/0040957 A1 | 2/2003 | Rhoads et al. |
| 2003/0056104 A1 | 3/2003 | Carr et al. |
| 2003/0081779 A1 | 5/2003 | Ogino |
| 2003/0099374 A1 | 5/2003 | Choi et al. |
| 2003/0105730 A1 | 6/2003 | Davis et al. |
| 2003/0130954 A1 | 7/2003 | Carr et al. |
| 2003/0156733 A1 | 8/2003 | Zeller et al. |
| 2004/0000787 A1 | 1/2004 | Vig et al. |
| 2004/0005093 A1 | 1/2004 | Rhoads |
| 2004/0075869 A1 | 4/2004 | Hilton et al. |
| 2004/0091131 A1 | 5/2004 | Honsigner et al. |
| 2004/0145661 A1 | 7/2004 | Murakami et al. |
| 2004/0190750 A1 | 9/2004 | Rodriguez et al. |
| 2004/0233465 A1 | 11/2004 | Coyle et al. |
| 2004/0240704 A1 | 12/2004 | Reed |
| 2004/0263911 A1 | 12/2004 | Rodriguez et al. |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0111027 A1 | 5/2005 | Codery et al. |
| 2005/0114668 A1 | 5/2005 | Haas et al. |
| 2005/0156048 A1 | 7/2005 | Reed et al. |
| 2005/0192933 A1 | 9/2005 | Rhoads et al. |
| 2005/0271246 A1 | 12/2005 | Sharma et al. |
| 2006/0013435 A1 | 1/2006 | Rhoads |
| 2006/0041591 A1 | 2/2006 | Rhoads |
| 2006/0075240 A1 | 4/2006 | Kalker et al. |
| 2006/0251291 A1 | 11/2006 | Rhoads |
| 2007/0027818 A1 | 2/2007 | Lofgren et al. |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0246543 A1 | 10/2007 | Jones et al. |
| 2007/0276841 A1 | 11/2007 | Rhoads et al. |
| 2007/0276928 A1 | 11/2007 | Rhoads et al. |
| 2008/0082616 A1 | 4/2008 | Jones |
| 2008/0121728 A1 | 5/2008 | Rodriguez |
| 2008/0133555 A1 | 6/2008 | Rhoads et al. |
| 2008/0215636 A1 | 9/2008 | Lofgren et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0129627 A1 | 5/2009 | Levy et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0009714 A1 | 1/2010 | Sharma et al. |
| 2010/0027837 A1 | 2/2010 | Levy et al. |
| 2010/0045816 A1 | 2/2010 | Rhoads |
| 2010/0054529 A1 | 3/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2010/0296526 A1 | 11/2010 | Rhoads |
| 2011/0007936 A1 | 1/2011 | Rhoads |

FOREIGN PATENT DOCUMENTS

| | | |
|---|---|---|
| EP | 590884 | 4/1994 |
| EP | 642060 | 3/1995 |
| EP | 705022 | 4/1996 |
| EP | 0961239 | 12/1999 |
| EP | 991047 | 4/2000 |
| EP | 1077570 | 2/2001 |
| EP | 1137244 | 9/2001 |
| EP | 1152592 | 11/2001 |
| EP | 1173001 | 1/2002 |
| EP | 1202250 | 5/2002 |
| EP | 1209897 | 5/2002 |
| GB | 1534403 | 12/1978 |
| GB | 2346110 | 8/2000 |
| GB | 2346111 | 8/2000 |
| GB | 2360659 | 9/2001 |
| JP | 7093567 | 4/1995 |
| JP | 7108786 | 4/1995 |
| WO | WO95/13597 | 5/1995 |
| WO | WO96/03286 | 2/1996 |
| WO | WO9936876 | 7/1999 |
| WO | WO01/05075 | 1/2001 |
| WO | WO01/08405 | 2/2001 |
| WO | WO01/39121 | 5/2001 |
| WO | WO01/72030 | 9/2001 |
| WO | WO01/73997 | 10/2001 |
| WO | WO01/97128 | 12/2001 |
| WO | WO01/97175 | 12/2001 |
| WO | WO02/19269 | 3/2002 |
| WO | WO02/21846 | 3/2002 |
| WO | WO02/23481 | 3/2002 |
| WO | WO 02/25599 | 3/2002 |
| WO | WO 0250773 | 6/2002 |
| WO | WO 02056264 | 7/2002 |
| WO | WO 02059712 | 8/2002 |
| WO | WO 02084990 | 10/2002 |
| WO | WO01/88883 | 11/2002 |
| WO | WO 02089057 | 11/2002 |
| WO | WO2004051917 | 6/2004 |

OTHER PUBLICATIONS

Briwnell, "Counterfeiters dye over security measures", http://oemagazine.com/fromTheMagazine/sep01/pdf/eyeontech.pdf>.*

Fleet et al, "Embedding invisible information in color images" Image Processing, 1997. Proceedings., International Conference on vol. 1, Oct. 26-29, 1997 pp. 532-535 vol. 1.*

O'Ruanaidh et al, "Watermarking digital images for copyright protection", Vision, Image and Signal Processing, IEE Proceedings-Publication Date: Aug. 1996, vol. 143, Issue: 4, On pp. 250-256.*

Piva, "Exploiting the cross-correlation of RGB-channels for robust watermarking of color images", Image Processing, 1999. ICIP 99. Proceedings. 1999 International Conference on vol. 1, 1999 pp. 306-310 vol. 1.*

Chun-Hsien et al, "Embedding Color Watermarks in Color Images", This paper appears in: Multimedia Signal Processing, 2001 IEEE Fourth Workshop on Publication Date: 2001, On pp. 327-332.*

Alattar, "'Smart Images' Using Digimarc's Watermarking Technology," IS&T/SPIE's 12.sup.th Int. Symposium on Electronic Imaging, San Jose, CA, Jan. 25, 2000, vol. 3971, No. 25, 10 pages.

Battialo et al., "Robust Watermarking for Images Based on Color Manipulation," IH/99 LNCS 1768, pp. 302-317, 2000.

Bender et al., "Applications for Data Hiding," IBM Systems Journal, vol. 39, Nos. 3&4, 2000, pp. 547-568.

Bors et al., "Image Watermarking Using DCT Domain Constraints," Proc. Int. Conf. on Image Processing, vol. 3, pp. 231-234.

Brownell, "Counterfeiters Dye Over Security Measures," SPIE's OE Magazine, Sep. 2001, pp. 8-9.

Fleet et al., "Embedding Invisible Information in Color Images," Proc. Int. Conf. on Image Processing, vol. 1, pp. 532-535, Oct. 1997.

Frequently Asked Questions About Digimarc Signature Technology, Aug. 1, 1995, HTTP://WWW.DIGIMARC.COM, 9 pages.

"Holographic signatures for digital images," The Seybold Report on Desktop Publishing, Aug. 1995, one page.

Hunt, "The Reproduction of Colour in Photography, Printing & Television," 1987, pp. 588, 589 and Plate 35 (in color).

Kohda et al., "Digital Watermarking Through CDMA Channels Using Spread Spectrum Techniques," 2000 IEEE, pp. 671-674.

Komatsu et al., "A Proposal on Digital Watermark in Document Image Communication and Its Application to Realizing a Signature," Electronics and Communications in Japan, Part 1, vol. 73, No. 5, 1990, pp. 22-33.

Komatsu et al., "Authentication System Using Concealed Image in Telematics," Memoirs of the School of Science & Engineering, Waseda Univ., No. 52, 1988, pp. 45-60.

Piva et al., "Exploiting the Cross-Correlation of RGB-Channels for Robust Watermarking of Color Images," 1999 IEEE, pp. 306-310.

Kutter et al., "Digital Signature of Color Images Using Amplitude Modulation," SPIE vol. 3022, 1997, pp. 518-526.

Vidal et al., "Non-Noticeable Information Embedding in Color Images: Marking and Detection," IEEE (1999), pp. 293-297.

Wang et al., "Embedding Digital Watermarks in Halftone Screens," Security and Watermaking of Multimedia Contents II, Proc. of SPIE vol. 3971 (2000), pp. 218-227.

Jan. 5, 2007 Notice of Allowance (including an Interview Summary); Dec. 12, 2006 Amendment and Terminal Disclaimer; and Dec. 1, 2006 non-final Office Action, each from assignee's U.S. Appl. No. 10/941,059 (now US Patent No. 7,213,757).

Mar. 17, 2008 Notice of Allowance; Jan. 1, 2008 Amendment and Terminal Disclaimer; and Sep. 25, 2007 non-final Office Action, each from assignee's U.S. Appl. No. 11/745,909 (published as US 2007-0246543 A1).

Jun. 6, 2008 non-final Office Action; Jan. 28, 2008 Amendment; and Jun. 12, 2007 Office Action; all from assignee's U.S. Appl. No. 10/723,181 (published as US 2004-0263911 A1).

Jul. 8, 2008 Notice of Reasons for Rejection from assignee's Japanese Application No. P2004-570949 (based on PCT application No. PCT/US03/37802).

Aug. 4, 2008 Amendment; Apr. 4, 2008 non-final Office Action; Feb. 28, 2008 Response to Restriction requirement; and Feb. 14, 2008 Requirement for Restriction; each from assignee's U.S. Appl. No. 10/989,737 (published as US 2005-0156048 A1).

U.S. Appl. No. 08/635,531, filed Apr. 25, 1996, Geoffrey B. Rhoads.

U.S. Appl. No. 09/413,117, filed Oct. 6, 1999, Geoffrey B. Rhoads.

U.S. Appl. No. 09/507,096, filed Feb. 17, 2000, Geoffrey B. Rhoads et al.

U.S. Appl. No. 12/912,461, filed Oct. 26, 2010, Adnan M. Alattar.

U.S. Appl. No. 09/482,749, filed Jan. 13, 2000, Geoffrey B. Rhoads.

U.S. Appl. No. 09/234,780, filed Jan. 20, 1999, Geoffrey B. Rhoads.

U.S. Appl. No. 09/343,104, filed Jun. 29, 1999, Tony F. Rodriguez et al.

U.S. Appl. No. 09/697,009, filed Oct. 25, 2000, Bruce L. Davis et al.

U.S. Appl. No. 09/967,015, filed Oct. 25, 2000, Bruce L. Davis.

U.S. Appl. No. 09/633,587, filed Aug. 7, 2000, Geoffrey B. Rhoads et al.

U.S. Appl. No. 09/567,405, filed May 8, 2000, Geoffrey B. Rhoads et al.

U.S. Appl. No. 09/689,289, filed Oct. 11, 2000, Geoffrey B. Rhoads et al.

U.S. Appl. No. 09/629,649, filed Aug. 1, 2000, J. Scott Carr et al.

U.S. Appl. No. 09/552,998, filed Apr. 19, 2000, Tony F. Rodriguez et al.

U.S. Appl. No. 09/343,101, filed Jun. 29, 1999, Bruce L. Davis et al.

U.S. Appl. No. 12/953,190, filed Nov. 23, 2010, Geoffrey B. Rhoads.

U.S. Appl. No. 09/538,493, filed Mar. 30, 2000, Geoffrey B. Rhoads.

U.S. Appl. No. 10/137,124, filed May 1, 2002, Brett A. Bradley et al.

* cited by examiner

|   |   |   |   |   |   |   |
|---|---|---|---|---|---|---|
| 1 | 1 | 1 | 0 | 1 | 0 | 0 |
| 1 | 0 | 1 | 0 | 0 | 1 | 1 |
| 0 | 1 | 1 | 0 | 0 | 1 | 0 |
| 0 | 1 | 0 | 1 | 1 | 1 | 0 |
| 1 | 0 | 1 | 1 | 0 | 0 | 1 |

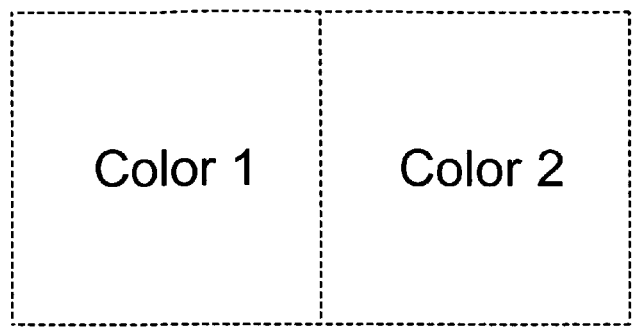
FIG. 5
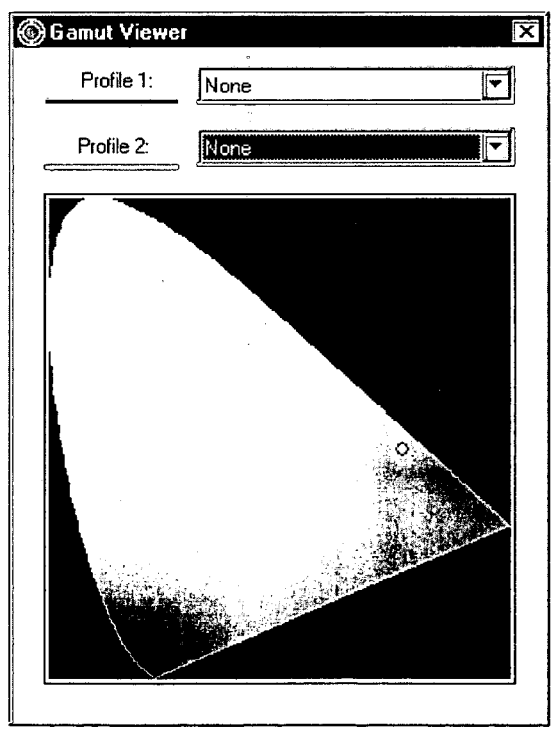 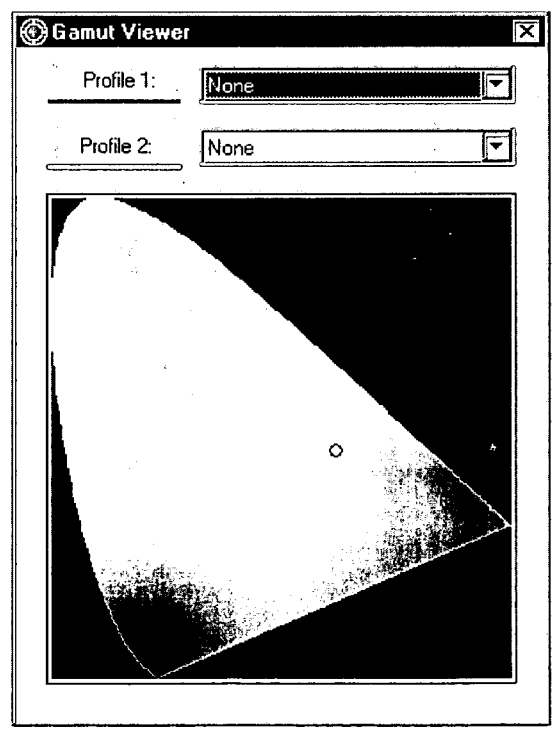
FIG. 6a          FIG. 6b

Color

Figure 3. 488 nm beamsplitter measured at 45 degrees angle of incidence with random polarization.

Figure 3. 488 nm beamsplitter measured at 45 degrees angle of incidence with random polarization.

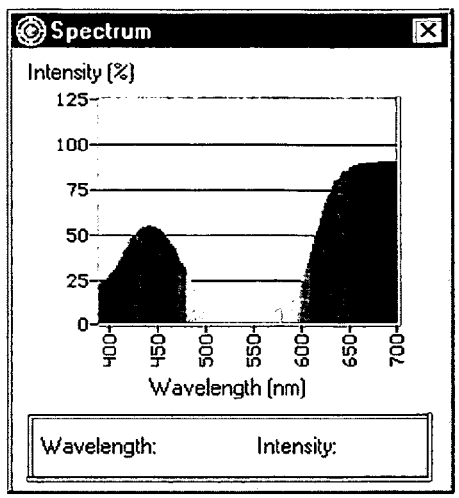 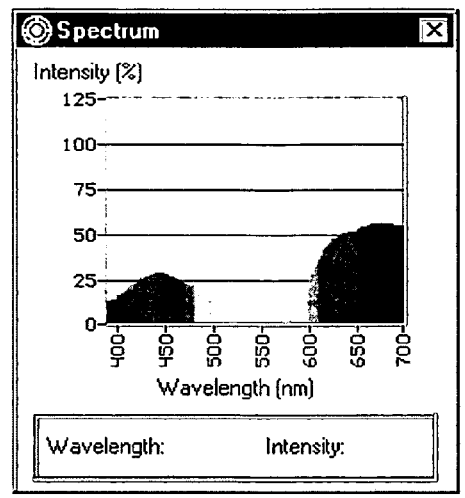
FIG. 12a     FIG. 12b
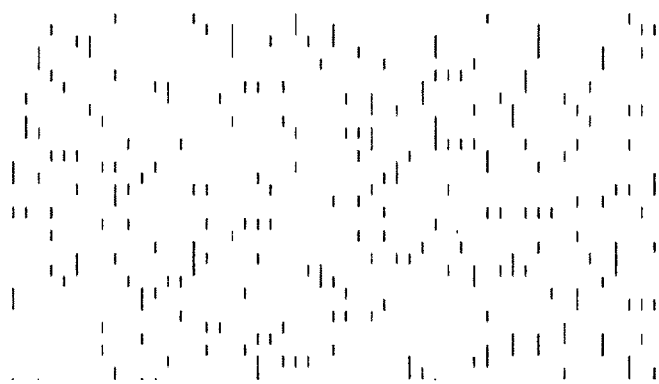
FIG. 13a
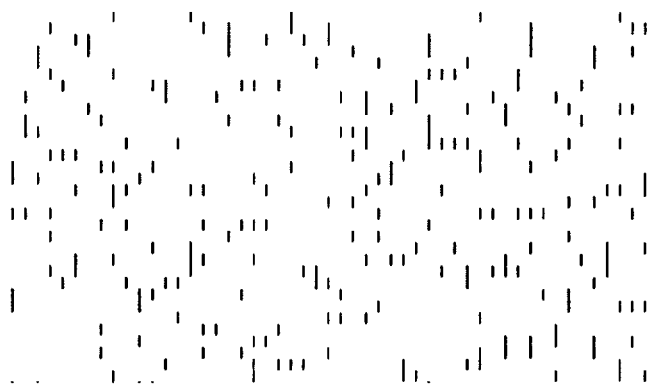
FIG. 13b

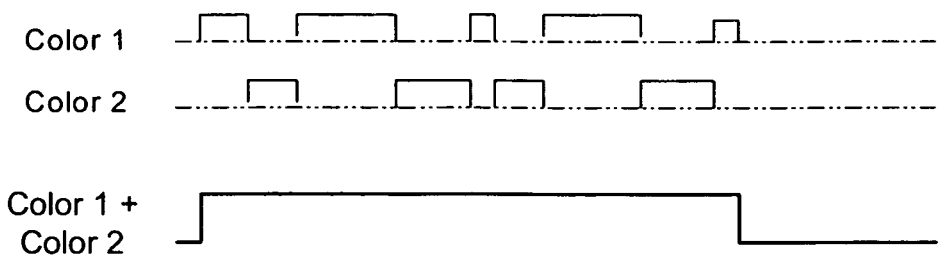
FIG. 14
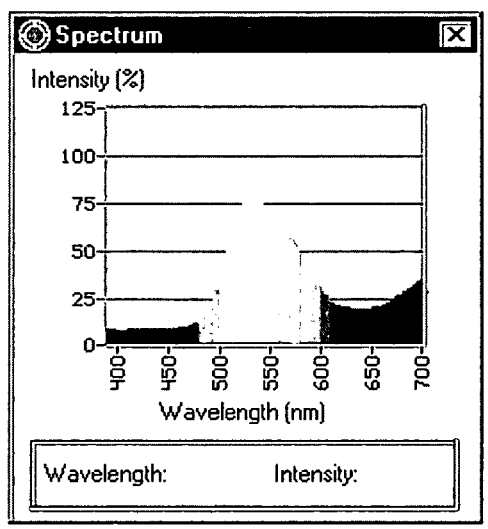
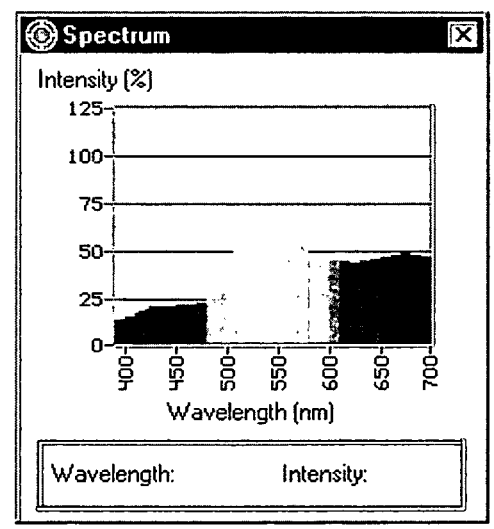
FIG. 15a
FIG. 15b

Pantone 246 process color equivalent to Pantone 246

Notch Filter Reflectivity

Pantone 246 * notch filter

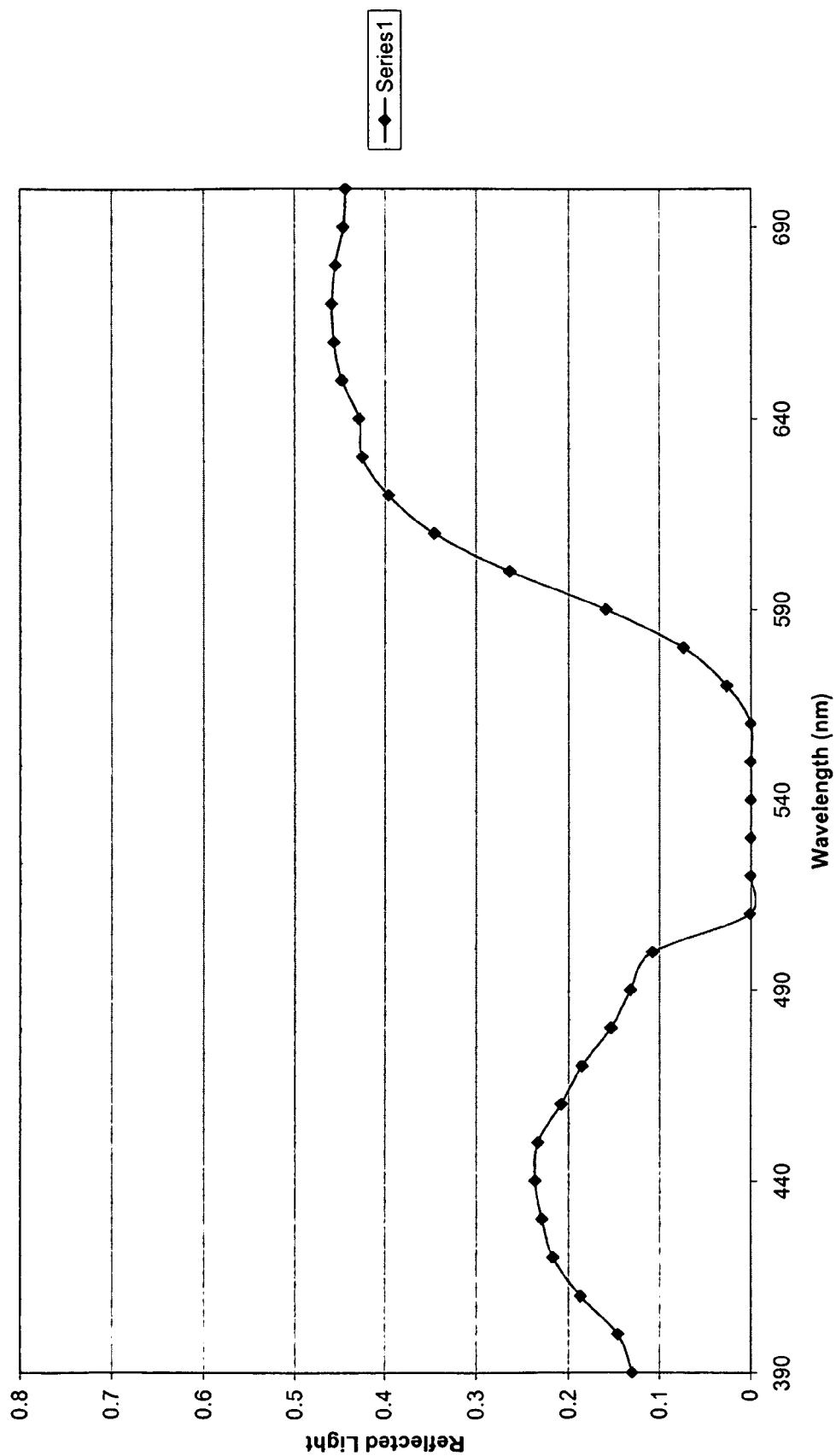

| Wavelength | PC246 | Notch filter | PC 246 * Fractional notch | Pantone 246 | Pantone 246 fractional notch | fractional notch |
|---|---|---|---|---|---|---|
| 390 | 0.1605109 | 81 | 0.130013829 | 0.2705096 | 0.219112776 | 0.81 |
| 400 | 0.1804102 | 81 | 0.146132262 | 0.3187281 | 0.258169761 | 0.81 |
| 410 | 0.2311074 | 81 | 0.187196994 | 0.4279009 | 0.346599729 | 0.81 |
| 420 | 0.2679191 | 81 | 0.217014471 | 0.515468 | 0.41752908 | 0.81 |
| 430 | 0.2827062 | 81 | 0.228992022 | 0.5493423 | 0.444967263 | 0.81 |
| 440 | 0.2918804 | 81 | 0.236423124 | 0.5607308 | 0.454191948 | 0.81 |
| 450 | 0.2851699 | 81.834198 | 0.233366501 | 0.5332623 | 0.436390926 | 0.81834198 |
| 460 | 0.2591885 | 80.19615936 | 0.207859223 | 0.458869 | 0.367995314 | 0.801961594 |
| 470 | 0.2254529 | 82.35919189 | 0.185681187 | 0.3583006 | 0.295093479 | 0.823591919 |
| 480 | 0.1910311 | 80.45088959 | 0.153686219 | 0.2546276 | 0.204850169 | 0.804508896 |
| 490 | 0.1611416 | 82.09939575 | 0.13229628 | 0.1708059 | 0.140230612 | 0.820993958 |
| 500 | 0.1340624 | 80.34358978 | 0.107710545 | 0.114135 | 0.091700156 | 0.803435898 |
| 510 | 0.1111428 | 0.80030489 | 0.000889481 | 0.0828016 | 0.000662665 | 0.008003049 |
| 520 | 0.0928389 | 0.020384941 | 1.89252E-05 | 0.0668688 | 1.36312E-05 | 0.000203849 |
| 530 | 0.0804474 | 0.133779824 | 0.000107622 | 0.0574337 | 7.68347E-05 | 0.001337798 |
| 540 | 0.072672 | 0.022189584 | 1.61256E-05 | 0.0532565 | 1.18174E-05 | 0.000221896 |
| 550 | 0.0636028 | 0.001935642 | 1.23112E-06 | 0.0538192 | 1.04175E-06 | 1.93564E-05 |
| 560 | 0.0545638 | 0.000655246 | 3.57527E-07 | 0.0608687 | 3.9884E-07 | 6.55246E-06 |
| 570 | 0.0543343 | 49.37767792 | 0.026829016 | 0.0806637 | 0.039829862 | 0.493776779 |
| 580 | 0.0895213 | 82.90610504 | 0.074218623 | 0.1216887 | 0.100887361 | 0.82906105 |
| 590 | 0.1897282 | 83.90197754 | 0.159185712 | 0.1935083 | 0.16235729 | 0.839019775 |
| 600 | 0.3188206 | 82.76811218 | 0.263881792 | 0.3206484 | 0.265394627 | 0.827681122 |
| 610 | 0.4178161 | 82.68417358 | 0.345467789 | 0.5089663 | 0.420834579 | 0.826841736 |
| 620 | 0.4743604 | 83.44670868 | 0.395838141 | 0.6899788 | 0.575764599 | 0.834467087 |
| 630 | 0.5043154 | 84.30607605 | 0.425168525 | 0.8070481 | 0.680390585 | 0.843060761 |
| 640 | 0.5218539 | 82.16420746 | 0.428777121 | 0.8583367 | 0.705245547 | 0.821642075 |
| 650 | 0.5421246 | 82.57830048 | 0.447677281 | 0.8841948 | 0.730153039 | 0.825783005 |
| 660 | 0.5567271 | 82 | 0.456516222 | 0.8935981 | 0.732750442 | 0.82 |
| 670 | 0.5601337 | 82 | 0.459309634 | 0.8979589 | 0.736326298 | 0.82 |
| 680 | 0.5550284 | 82 | 0.455123288 | 0.9027258 | 0.740235156 | 0.82 |
| 690 | 0.5443422 | 82 | 0.446360604 | 0.9050937 | 0.742176834 | 0.82 |
| 700 | 0.5409709 | 82 | 0.443596138 | 0.9213995 | 0.75554759 | 0.82 |

FIG. 18f

Pantone 7488

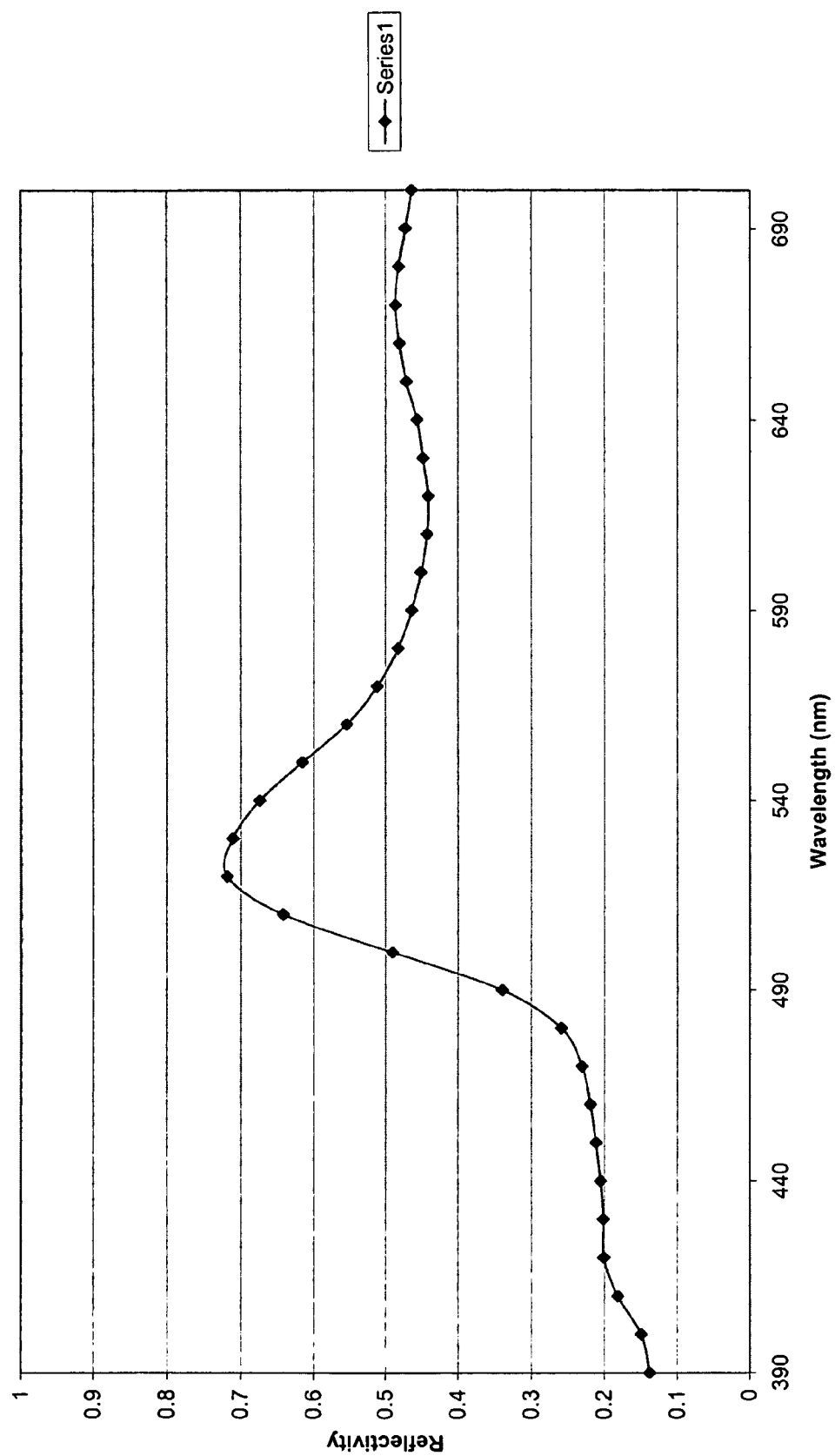

Notch Filter Reflectivity

Pantone 7488 * notch filter

PC7488 * Notch filter

| Wavelength | PC7488 | Notch filter | PC7488 * Fractional notch | paper white | Pan 7488 | Pantone 7488 * fractional notch | fractional notch * white |
|---|---|---|---|---|---|---|---|
| 390 | 0.137657 | 81 | 0.027161839 | 0.2435992 | 0.0862935 | 0.017027032 | 0.19731535 |
| 400 | 0.1493566 | 81 | 0.038580565 | 0.3189034 | 0.0819443 | 0.021167176 | 0.25831175 |
| 410 | 0.1818408 | 81 | 0.082387292 | 0.5593503 | 0.0904887 | 0.040998054 | 0.45307374 |
| 420 | 0.2006256 | 81 | 0.143203195 | 0.8812139 | 0.0918612 | 0.065568987 | 0.71378326 |
| 430 | 0.2017215 | 81 | 0.169059169 | 1.0346692 | 0.0870638 | 0.072966608 | 0.83808205 |
| 440 | 0.2052675 | 81 | 0.171167817 | 1.0655642 | 0.0848606 | 0.073243778 | 0.863107 |
| 450 | 0.2116283 | 81.834198 | 0.180972213 | 1.0449688 | 0.0889793 | 0.076089922 | 0.85514184 |
| 460 | 0.2192525 | 80.19615936 | 0.177827163 | 1.0113465 | 0.1002362 | 0.081297678 | 0.81106105 |
| 470 | 0.2304714 | 82.35919189 | 0.18855504 | 0.9933654 | 0.1155671 | 0.094548648 | 0.81812772 |
| 480 | 0.2590552 | 80.45088959 | 0.204095037 | 0.9792854 | 0.1531952 | 0.120693891 | 0.78784382 |
| 490 | 0.3392308 | 82.09939575 | 0.270511241 | 0.9712926 | 0.2607959 | 0.207965263 | 0.79742536 |
| 500 | 0.4899786 | 80.34358978 | 0.380468416 | 0.9664742 | 0.4704831 | 0.365330158 | 0.77650007 |
| 510 | 0.6417708 | 0.800030489 | 0.004931598 | 0.960179 | 0.6771424 | 0.005203406 | 0.00768436 |
| 520 | 0.7179542 | 0.020384941 | 0.000139087 | 0.9503431 | 0.7765788 | 0.000150444 | 0.00019373 |
| 530 | 0.7102945 | 0.133779824 | 0.000892946 | 0.9397146 | 0.7790003 | 0.000979319 | 0.00125715 |
| 540 | 0.6736852 | 0.022189584 | 0.000141 | 0.9432175 | 0.7480425 | 0.000156562 | 0.0002093 |
| 550 | 0.6156795 | 0.001935642 | 1.11965E-05 | 0.9395097 | 0.6875426 | 1.25033E-05 | 1.8186E-05 |
| 560 | 0.5539597 | 0.000665246 | 3.36382E-06 | 0.9267226 | 0.6129751 | 3.72218E-06 | 6.0723E-06 |
| 570 | 0.5113897 | 49.37767792 | 0.236255866 | 0.935621 | 0.5387311 | 0.248887262 | 0.46198792 |
| 580 | 0.4823525 | 82.90610504 | 0.377131183 | 0.9430645 | 0.4526693 | 0.353923134 | 0.78185804 |
| 590 | 0.46334 | 83.90197754 | 0.367736298 | 0.945942 | 0.3591755 | 0.28506468 | 0.79366404 |
| 600 | 0.450426 | 82.76811218 | 0.354569598 | 0.9510755 | 0.2759803 | 0.21724817 | 0.78718724 |
| 610 | 0.4425348 | 82.68417358 | 0.349558027 | 0.9553213 | 0.2229356 | 0.176096724 | 0.78989952 |
| 620 | 0.4408913 | 83.44670868 | 0.35033841 | 0.9522413 | 0.2000638 | 0.158973501 | 0.79461402 |
| 630 | 0.4480076 | 84.30607605 | 0.363747857 | 0.9630663 | 0.1967001 | 0.159705415 | 0.81192341 |
| 640 | 0.4560783 | 82.16420746 | 0.361060083 | 0.9635126 | 0.1969845 | 0.155594524 | 0.79166249 |
| 650 | 0.4706289 | 82.57830048 | 0.375198928 | 0.9654217 | 0.2041635 | 0.162765029 | 0.79722883 |
| 660 | 0.4802375 | 82 | 0.382510955 | 0.971346 | 0.2261971 | 0.162765029 | 0.79650372 |
| 670 | 0.4855846 | 82 | 0.385564336 | 0.9758525 | 0.263801 | 0.211109331 | 0.800019905 |
| 680 | 0.4811776 | 82 | 0.386880283 | 0.980522 | 0.3045346 | 0.244854358 | 0.80402804 |
| 690 | 0.4716134 | 82 | 0.376829608 | 0.9744174 | 0.3405156 | 0.272079547 | 0.79902227 |
| 700 | 0.4634339 | 82 | 0.372861013 | 0.9811724 | 0.3695189 | 0.297300632 | 0.80456137 |

FIG. 19f

Pantone 246 process color equivalent to P246

Red LED

Pantone 246 * Red LED

PC246 * Red LED

| Wavelength | PC246 | Red LED | PC 246 * Red LED | Pantone 246 | Pantone 246 * Red LED |
|---|---|---|---|---|---|
| 390 | 0.1605109 | 0 | 0 | 0.2705096 | 0 |
| 400 | 0.1804102 | 0 | 0 | 0.3187281 | 0 |
| 410 | 0.2311074 | 0 | 0 | 0.4279009 | 0 |
| 420 | 0.2679191 | 0 | 0 | 0.515468 | 0 |
| 430 | 0.2827062 | 0 | 0 | 0.5493423 | 0 |
| 440 | 0.2918804 | 0 | 0 | 0.5607308 | 0 |
| 450 | 0.2851699 | 0 | 0 | 0.5332623 | 0 |
| 460 | 0.2591885 | 0 | 0 | 0.458869 | 0 |
| 470 | 0.2254529 | 0 | 0 | 0.3583006 | 0 |
| 480 | 0.1910311 | 0 | 0 | 0.2546276 | 0 |
| 490 | 0.1611416 | 0 | 0 | 0.1708059 | 0 |
| 500 | 0.1340624 | 0 | 0 | 0.114135 | 0 |
| 510 | 0.1111428 | 0 | 0 | 0.0828016 | 0 |
| 520 | 0.0928389 | 0 | 0 | 0.0668688 | 0 |
| 530 | 0.0804474 | 0 | 0 | 0.0574337 | 0 |
| 540 | 0.072672 | 0 | 0 | 0.0532565 | 0 |
| 550 | 0.0636028 | 0 | 0 | 0.0538192 | 0 |
| 560 | 0.0545638 | 0 | 0 | 0.0608687 | 0 |
| 570 | 0.0543343 | 0 | 0 | 0.0806637 | 0 |
| 580 | 0.0895213 | 0 | 0 | 0.1216887 | 0 |
| 590 | 0.1897282 | 0.02 | 0.003794564 | 0.1935083 | 0.003870166 |
| 600 | 0.3188206 | 0.05 | 0.01594103 | 0.3206484 | 0.01603242 |
| 610 | 0.4178161 | 0.1 | 0.04178161 | 0.5089663 | 0.05089663 |
| 620 | 0.4743604 | 0.3 | 0.14230812 | 0.6899788 | 0.20699364 |
| 630 | 0.5043154 | 0.6 | 0.30258924 | 0.8070481 | 0.48422886 |
| 640 | 0.5218539 | 0.9 | 0.46966851 | 0.8583367 | 0.772503030 |
| 650 | 0.5421246 | 1 | 0.5421246 | 0.8841948 | 0.8841948 |
| 660 | 0.5567271 | 0.9 | 0.50105439 | 0.8935981 | 0.80423829 |
| 670 | 0.5601337 | 0.6 | 0.33608022 | 0.8979589 | 0.53877534 |
| 680 | 0.5550284 | 0.3 | 0.16650852 | 0.9027258 | 0.27081774 |
| 690 | 0.5443422 | 0.1 | 0.05443422 | 0.9050937 | 0.09050937 |
| 700 | 0.5409709 | 0.05 | 0.027048545 | 0.9213995 | 0.046069975 |

FIG. 20f

Pantone 7488 process color equivalent to Pantone 7488

Red LED

Pantone 7488 * Red LED

PC7488 * Red LED

| Wavelength | PC7488 | Green LED | PC 7488 * Green LED | Pan 7488 | Pantone 7488 * green LED |
|---|---|---|---|---|---|
| 390 | 0.137657 | 0 | 0 | 0.0862935 | 0 |
| 400 | 0.1493566 | 0 | 0 | 0.0819443 | 0 |
| 410 | 0.1818408 | 0 | 0 | 0.0904887 | 0 |
| 420 | 0.2006256 | 0 | 0 | 0.0918612 | 0 |
| 430 | 0.2017215 | 0 | 0 | 0.0870638 | 0 |
| 440 | 0.2052675 | 0 | 0 | 0.0848606 | 0 |
| 450 | 0.2116283 | 0 | 0 | 0.0889793 | 0 |
| 460 | 0.2192525 | 0 | 0 | 0.1002362 | 0 |
| 470 | 0.2304714 | 0 | 0 | 0.1155671 | 0 |
| 480 | 0.2590552 | 0 | 0 | 0.1531952 | 0 |
| 490 | 0.3392308 | 0 | 0 | 0.2607959 | 0 |
| 500 | 0.4899786 | 0 | 0 | 0.4704831 | 0 |
| 510 | 0.6417708 | 0 | 0 | 0.6771424 | 0 |
| 520 | 0.7179542 | 0 | 0 | 0.7765788 | 0 |
| 530 | 0.7102945 | 0 | 0 | 0.7790003 | 0 |
| 540 | 0.6736852 | 0 | 0 | 0.7480425 | 0 |
| 550 | 0.6156795 | 0 | 0 | 0.6875426 | 0 |
| 560 | 0.5539597 | 0 | 0 | 0.6129751 | 0 |
| 570 | 0.5113897 | 0.02 | 0.010227794 | 0.5387311 | 0.010774622 |
| 580 | 0.4823525 | 0.05 | 0.024117625 | 0.4526693 | 0.022633465 |
| 590 | 0.46334 | 0.1 | 0.046334 | 0.3591755 | 0.03591755 |
| 600 | 0.450426 | 0.25 | 0.1126065 | 0.2759803 | 0.068995075 |
| 610 | 0.4425348 | 0.4 | 0.17701392 | 0.2229356 | 0.08917424 |
| 620 | 0.4408913 | 0.65 | 0.286579345 | 0.2000638 | 0.13004147 |
| 630 | 0.4480076 | 1 | 0.4480076 | 0.1967001 | 0.1967001 |
| 640 | 0.4560783 | 0.9 | 0.41047047 | 0.1969845 | 0.17728605 |
| 650 | 0.4706289 | 0.6 | 0.28237734 | 0.2041635 | 0.1224981 |
| 660 | 0.4802375 | 0.3 | 0.14407125 | 0.2261971 | 0.067785913 |
| 670 | 0.4855846 | 0.1 | 0.04855846 | 0.263801 | 0.0263801 |
| 680 | 0.4811776 | 0.05 | 0.024055888 | 0.3045346 | 0.015226673 |
| 690 | 0.4716134 | 0.02 | 0.009432268 | 0.3405156 | 0.006810312 |
| 700 | 0.4634339 | 0 | 0 | 0.3695189 | 0 |

FIG. 21f

FRAGILE AND EMERGING DIGITAL WATERMARKS

RELATED APPLICATION DATA

This application claims the benefit of U.S. Provisional Patent Application No. 60/466,926, filed Apr. 30, 2003. This application is also a continuation-in-part of U.S. patent application Ser. No. 10/823,514, filed Apr. 12, 2004, which is a continuation of U.S. patent application Ser. No. 09/898,901, filed Jul. 2, 2001 (now U.S. Pat. No. 6,721,440).

This application is also related to U.S. Pat. Nos. 6,332,031 and 6,449,377, U.S. application Ser. Nos. 09/938,870, filed Aug. 23, 2001 (published as US 2002-0099943 A1), Ser. No. 09/731,456, filed Dec. 6, 2000 (published as US 2002-0031240 A1), Ser. No. 10/052,895, filed Jan. 17, 2002 (published as US 2002-0105679 A1), Ser. No. 09/840,016, filed Apr. 20, 2001 (published as US 2002-0054355 A1), and International Application PCT/US02/20832, filed Jul. 1, 2002 (published as WO 03/005291).

Each of the above patent documents is herein incorporated by reference.

TECHNICAL FIELD

The invention relates to counterfeit detection, embedded signaling in printed matter for authentication, and digital watermarking.

BACKGROUND AND SUMMARY

The advances in digital imaging and printing technologies have vastly improved desktop publishing, yet have provided counterfeiters with low cost technologies for illegally counterfeiting security and value documents, like identity documents (e.g., drivers licenses, passports, ID documents, etc.), banknotes, checks, etc. While there are many technologies that make counterfeiting more difficult, there is a need for technologies that can quickly and accurately detect copies. Preferably, these technologies should integrate with existing processes for handling the value documents. For example, in the case of value documents like checks, there is a need for copy detection technology that integrates within the standard printing and validation processes in place today. Further, as paper checks are increasingly being scanned and processed in the digital realm, anti-counterfeiting technologies need to move into this realm as well.

One promising technology for automated copy detection is digital watermarking. Digital watermarking is a process for modifying physical or electronic media to embed a hidden machine-readable code into media. The media may be modified such that the embedded code is imperceptible or nearly imperceptible to a user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

In the case of value documents, digital watermarking can be applied to printed objects for copy detection. In some applications, the digital watermarking techniques can be generalized to auxiliary data embedding methods that can be used to create designed graphics, features or background patterns on value documents that carry auxiliary data. These more general data embedding methods creates printable image features that carry auxiliary data covertly, yet are not necessarily invisible. They afford the flexibility to create aesthetically pleasing graphics or unobtrusive patterns that carry covert signals used to authenticate the printed object and distinguish copies from originals.

Auxiliary data embedding systems for documents typically have two primary components: an encoder that embeds the auxiliary signal in a host document image, and a decoder that detects and reads the embedded auxiliary signal from a document. The encoder embeds the auxiliary signal by subtly altering an image to be printed on the host signal or generating an image carrying the auxiliary data. The reading component analyzes a suspect image scanned from the document to detect whether an auxiliary signal is present, and if so, extracts information carried in it.

Several particular digital watermarking and related auxiliary data embedding techniques have been developed for print media. The reader is presumed to be familiar with the literature in this field. Particular techniques for embedding and detecting imperceptible digital watermarks in media signals are detailed in the assignee's co-pending U.S. Pat. Nos. 6,614,914 and 6,122,403, which are each herein incorporated by reference.

This disclosure describes methods and systems for using embedded auxiliary signals in documents for copy detection and message conveyance. An auxiliary signal is formed as an array of elements selected from a set of print structures with properties that change differently in response to copy operations. These changes in properties of the print structures that carry the embedded auxiliary signal are automatically detectable. For example, the changes make the embedded auxiliary signal more or less detectable. Examples of sets of properties of the print structures that change differently in response to copy operations include a color or set of colors.

Further features and advantages will become even more apparent with reference to the following detailed description and accompanying drawings.

BRIEF DESCRIPTION OF THE DRAWINGS

FIG. 5 illustrates an example of a set of properties of a print structure that respond differently to copy operations. In this example, the set includes two different colors, color 1 and color 2.

FIG. 6*a* illustrates placement of a spot color within a gamut of human perceptible colors (at a given luminance); and FIG. 6*b* illustrates a color shift for a process color approximation of the spot color in the FIG. 6*a* gamut.

FIG. 12a illustrates a spectral response for a spot color (Pantone® 246).

FIG. 12b illustrates a spectral response for a process color approximation of the FIG. 12b spot color (Pantone® 246).

FIG. 13a illustrates relative detectability of a nascent watermark in an original.

FIG. 13b illustrates relative detectability of the FIG. 13a nascent watermark in a counterfeit.

FIG. 14 illustrates line continuity modulation for a two-color channel watermarking technique.

FIG. 15a illustrates a spectral response for a spot color (Pantone® 7488). The spectral response is approximately inversely related to the FIG. 11b notch filter with illumination.

FIG. 15b illustrates a spectral response for a process color approximation of the FIG. 15a spot color (Pantone® 7488).

FIGS. 18a-18f illustrate copy detection for a particular spot color (Pantone® 246) and process color approximation using a notch filter with illumination.

FIGS. 19a-19f illustrate copy detection for a particular spot color (Pantone® 7488) and process color approximation using a notch filter with illumination.

FIGS. 20a-20f illustrate copy detection for a particular spot color (Pantone® 246) and process color approximation using illumination.

FIGS. 21a-21f illustrate copy detection for a particular spot color (Pantone® 7488) and process color approximation using illumination.

DETAILED DESCRIPTION

Figure 1:
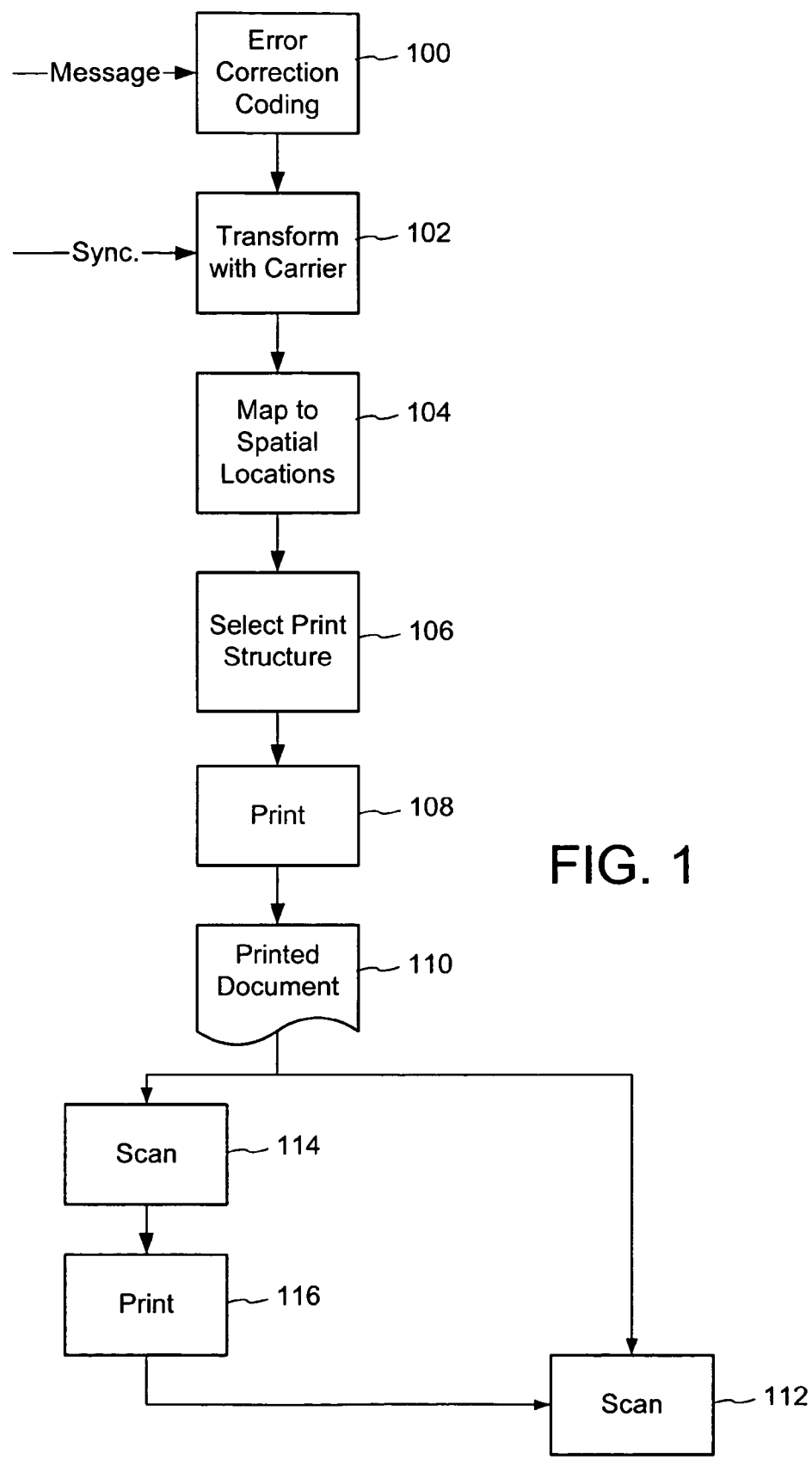
FIG. 1 illustrates a process for generating an auxiliary data signal for printing on print media for authentication.

The following sections describe various automated techniques for distinguishing a copy from an original, among other features Auxiliary Signal Generation, Embedding and Detection FIG. 1 illustrates a process for generating an auxiliary data signal for printing on print media for authentication. This process is similar to digital watermark generation of certain embodiments described in U.S. Pat. Nos. 6,614,914 and 6,122,403, each of which is herein incorporated by reference. In copy detection applications for value documents (e.g., identification documents, banknotes, checks, etc.), there is often greater flexibility in designing the structure of the digital watermark signal because there is flexibility in the artwork of the document, and the digital watermark need not be hidden in a fixed image. Instead, the signal can be designed to have a particular, unobtrusive style and structure, such as a graphic or background pattern. In one implementation, the structure of the signal appears as collection of lines of varying length, but the signal may also be formed of other structures (e.g., different halftone screen elements, varying line widths, varying dot sizes and shapes, etc.)

The auxiliary data signal carries a message. This message may include one or more fixed and variable parts. The fixed parts can be used to facilitate detection, avoid false positives, and enable error measurement as an authentication metric of the printed article. The variable parts can carry variety of information, such as unique identifier (e.g., serving to index relating data in a database), authentication information such as data or feature metrics (or hash of same) on the printed object, and error detection information computed as a function of the other message elements.

The auxiliary signal generator of FIG. 1 performs error correction coding (100) on the message to make it more robust. Examples include block codes (e.g., BCH codes), convolutional codes, turbo codes, M-ary modulation, and combinations of these coding methods (e.g., concatenated codes). Next, the signal generator transforms the error correction coded message with a carrier signal (102). One example is to spread it over a pseudorandom sequence through multiplication, XOR, or convolution. For example, each element of the error correction coded signal is spread over N corresponding elements of the carrier signal.

Some form of geometric synchronization signal may be formed with the auxiliary signal at this stage or subsequent stages. One example is formation of the signal such that it has detectable registration peaks in a transform domain, such as a spatial frequency domain, convolution domain and/or correlation domain.

As part of the signal generation process, the auxiliary signal generator maps the elements of the signal to spatial locations of a target print object (104). These locations form a tiled pattern of rectangular arrays, such as the small array shown in FIG. 3, or some other geometric pattern. This mapping may be used to structure the auxiliary signal into a pattern of blocks or other shapes that produce detectable energy peaks in the convolution, autocorrelation, frequency (e.g., FFT magnitude) or some other transform domain. These detectable energy peaks may be used as the geometric synchronization signal. Further, by replicating the auxiliary signal over this pattern, the repetitions inherent in this process can be used to enhance the robustness of the message (as a form of repetition coding that is exploited in the auxiliary data reader), and make the message detectable in small excerpts of the printed document where it is repeated (e.g., robust to cropping).

Figures 3, 4:
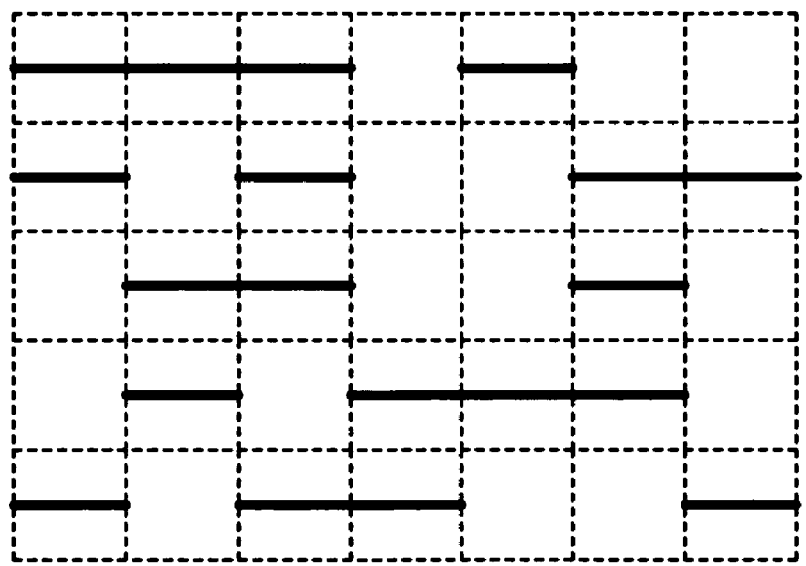
FIG. 3 is a diagram illustrating an example of an auxiliary data signal in binary form.
FIG. 4 is a diagram illustrating how the auxiliary signal of FIG. 3 can be mapped to different types of print structures, such as line structures, to embed the auxiliary signal into a printed image.

At this point, the auxiliary signal comprises an array of binary or multilevel values (i.e. more than two binary states) at each spatial location. For the sake of explanation, we will refer to these locations as embedding locations. FIG. 3 shows an example of an array of embedding locations, with binary values of the auxiliary signal mapped to each of the locations. If the signal is multilevel, it may be thresholded to generate a binary signal if desired.

Next, the signal generator selects a print structure for each embedding location (106). One can consider the signal value at the embedding location as an index to the desired print structure. This print structure may be selected from a set of possible print structures. One simple set for the binary state is the presence or absence of an ink dot, line or other shape. FIG. 4 for example, shows a case where the binary value 1 maps to the presence of a line structure, while the binary value 0 maps to the absence of the line structure. Other examples of binary states include, for example, a structure at color 1 (e.g., using ink 1) and a structure at color 2 (e.g., using ink 2) as shown in FIG. 5.

Another example is a first structure at dot pattern or halftone screen 1 and a second structure at dot pattern or screen 2. As a specific example, one print structure might be made using a 600 dot per inch (dpi) diffusion dither of a tone, while the other structure is made using a 150-line screen of the tone. One can find pixel 8 bit pixel values for each of these print structures at an embedding location (e.g., of size 50 embedding location per inch) that, when scanned, have the same gray value. However, due to the difference in dot gain, the print structures have different gray values after subsequent print generations that occur during copying. These two different print structures can be mapped to the embedding locations based on the binary value at the embedding location, such as shown in FIG. 3. This process creates a signal where there is no luminance difference before the dot gain effect due to copying, but an increase in luminance difference after the dot gain. This shift in luminance that occurs between the two types of print structures causes the embedded signal to become detectable in copies, yet remain undetectable in originals.

More examples include a structure that has aliasing property 1, and a structure that has aliasing property 2. As in the case of different colors or dot gains, the difference in the aliasing property due to copying can alter the embedding location's appearance and either make the embedded signal more or less detectable.

As explained in further detail below, these structures can be selected so that they have measurable values, such as luminance, intensity, or some other characteristic, that diverge or converge in response to a copy operation. Combinations of these structural features may be combined to make the divergence or convergence more dramatic. In addition, combinations of these features may be used to represent multiple auxiliary signal states at the embedding location.

The example shown in FIG. 4 is sometimes referred to as line continuity modulation because the auxiliary signal is carried in an image of lines by varying the continuity of the lines. For example, the auxiliary signal is embedded in the line image by selectively breaking the lines where the corresponding embedding location value is zero.

After selecting the desired print structures for each embedding location, the result is an image that is ready for printing. The print structures may be designed and specified in a format that is compatible with the type of printer used to print the image on a substrate such as paper, plastic, etc. Many printers require that image or other data be formatted into an image compatible for printing on the particular printer in a process called RIP or Raster Image Processing. This RIP transforms the input image into an image comprised of an array of the print structures compatible with the printer hardware. These print structures may include line screens, halftone dots (clustered dots), dither matrices, halftone images created by error diffusion, etc. Our implementation may be integrated with the RIP to create an image formatted for printing that has the desired print structure per embedding location. Alternatively, it may be designed to be ready for printing such that the RIP process is unnecessary or by-passed.

As an alternative to selecting print structures in block 106, the auxiliary signal generator may produce an array of values that specify a change to the print structure of a host image into which the auxiliary signal is to be embedded. For example, the array of values in FIG. 3 may specify that the luminance of the print structure at the corresponding embedding location is to be increased or decreased. Rather than specifying the print structure to be printed, the auxiliary signal from block 104 may specify changes to print structures of a pre-existing image so as to embed the auxiliary data in this pre-existing image. This method has the flexibility of either designing an image carrying the auxiliary data by selecting the desired print structures, or embedding the auxiliary data in a pre-existing image by making desired changes, as necessary, to the print structures. For example, the auxiliary signal could indicate to print at the same ink dot, line or shape density, but change its color at the embedding location. As another example, the auxiliary signal could indicate to print at the same color, but change its density. As another example, the auxiliary signal could indicate to print at the same color and overall ink coverage per the embedding location, but use different numbers or sizes of ink shapes within the embedding location.

In block 108, a printer prints the resulting image on a substrate. This produces a printed document (110). The term "document" generally encompasses a variety of printed objects, including security documents, identify documents, banknotes, checks, packages, packaging, labels and tags, etc. or any other type of printed article where copy detection is relevant.

The bottom of FIG. 1 generally illustrates the types of activities that the auxiliary signal is designed to detect. An authentic document is expected not to have any intervening copy operations, and instead be input to an authentication scan process 112 directly. This authentication scan process may occur at any point to authenticate the printed document, such as when it is presented for access, payment, or when it is spot checked. Copies, in contrast, will undergo an intervening copy operation, which is generally illustrated as a scan 114 and print 116 cycle before the authentication scan 112. This scan print cycle 114-116 may be performed on a copy machine with integrated scanning and printing or in separate scan and print operations.

Figure 2:
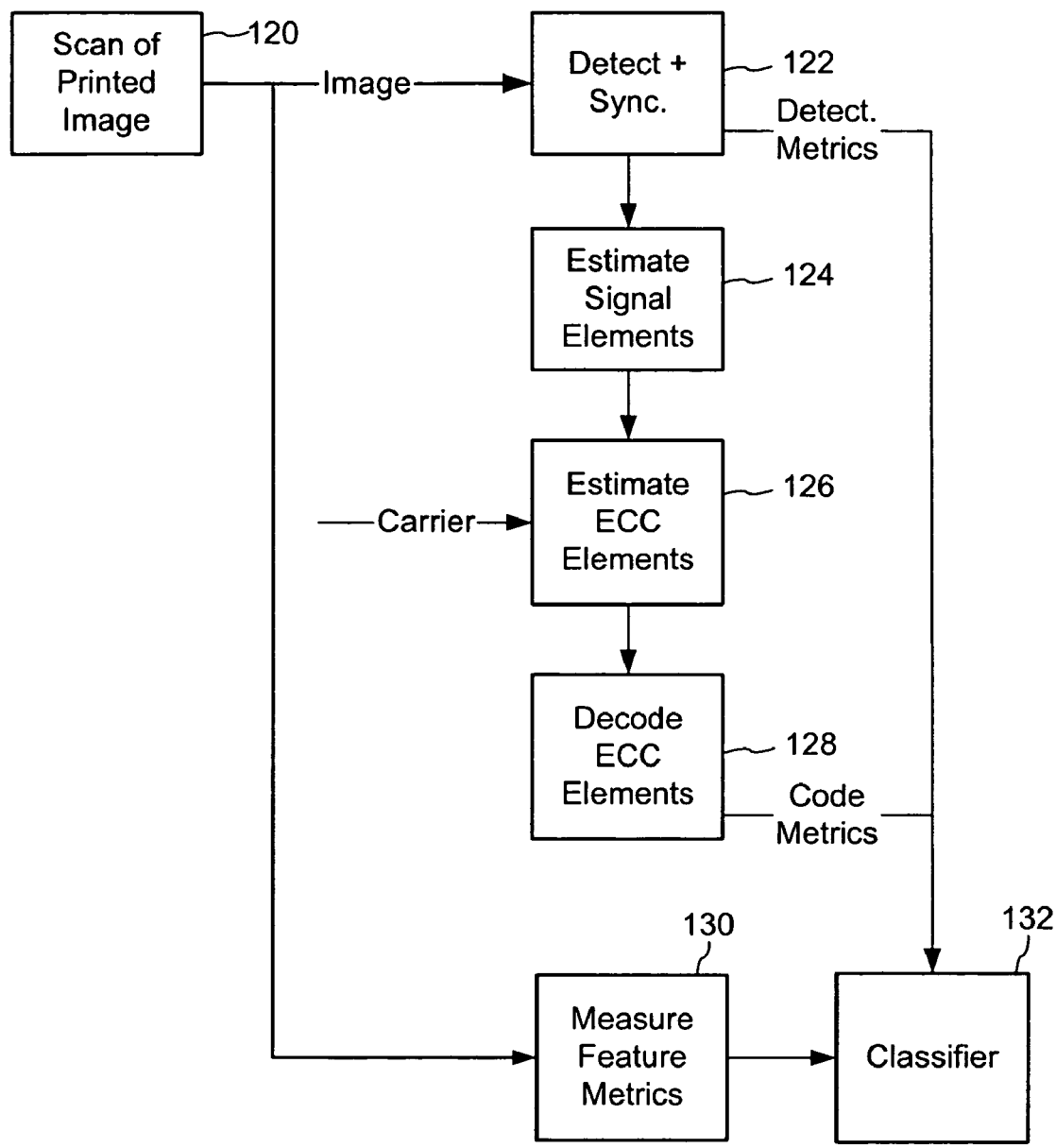
FIG. 2 illustrates a process for authenticating a printed object using metrics derived from an embedded auxiliary signal and print feature metrics.

The copy operation is expected to make certain aspects of the printed image change, and copy detection process of FIG. 2 is designed to detect these changes. This process has two primary ways of detecting these changes:
1. Measuring changes to the auxiliary signal generated and printed in the image as described above; and
2. Making changes to other features on the printed image that are measurable from an image scan of that printed image. As we will illustrate, examples of these features include print structures that have detectable changes due to copying, like structures that alias in a particular way, shift in color, or dot gain. These features can overlap with the auxiliary signal because the auxiliary signal can be constructed from these print structures at the embedding locations as explained above.

The authentication process starts with the authentication scan of the printed image (120). The quality of this scan varies with the implementation. In some cases, it is an 8 bit per pixel grayscale value at particular resolution such as 100 to 300 dpi. In other cases, it is a binary image. The parameters of the auxiliary signal and other copy detect features are designed accordingly.

The process of extracting the auxiliary signal is illustrated in blocks 122 to 128. An auxiliary signal reader begins by detecting the synchronization signal of the auxiliary signal. For example, it detects transform domain peaks of the synchronization signal, and correlates them with a known synchronization pattern to calculate rotation, scale and translation (origin of the auxiliary signal). Examples of this process are described in U.S. Pat. Nos. 6,614,914 and 6,122,403.

As shown in FIG. 2, the detection of the auxiliary signal, or more specifically, the synchronization signal component, can be used as one of the metrics for copy detection. One such metric is the maximum correlation value in the correlation space computed by correlating the synchronization pattern and the known pattern, and another metric is the relative values of the highest correlation peak and one or more lower correlation peaks in this correlation space.

The next step in extracting the message from the auxiliary data is estimating the signal elements (124). The reader looks at the synchronized array of image values and estimates the value of the auxiliary signal at each embedding location. For example, in the case where the auxiliary signal is embedded by adjusting the luminance up or down relative to neighboring locations, the reader predicts the value of the auxiliary signal element by comparing the luminance of the embedding location of interest with its neighbors.

Next, the reader performs the inverse of the transform with the carrier to get estimates of the error correction encoded elements (126). In the case of a spreading carrier, the reader accumulates the contributions of the auxiliary signal estimates from the N embedding locations to form the estimate of the error correction encoded element. The reader then performs error correction decoding on the resulting signal to extract the embedded message (128). This message can then be used to provide further copy detect metrics, referred to as code metrics in FIG. 2. One such example is to compare the input to the error correction decoder of block 128 with a perfectly reconstructed error correction encoded message. This can be achieved by verifying that the message has no errors using the error detection part of the message, and then re-applying block 100 to the verified message. This is just one example of a method for measuring the bit errors in the extracted auxiliary signal as a copy detection metric. More examples and details are provided in U.S. patent application Ser. Nos. 10/349,321 (published as US 2003-0177359 A1) and Ser. No. 09/938,870 (published as US 2002-0099943 A1), which are each herein incorporated by reference.

In addition to the metrics based on the embedded auxiliary signal, the reader also computes metrics based on other features on the printed object (130). Some examples include analysis of aliasing of certain structures, frequency domain analysis of certain structures that change in a predictable way in response to a copy operation, analysis of fonts on the printed object to detect changes in the fonts due to copying or swapping operations, etc. All these metrics are input to a classifier 132 that determines whether the metrics, when taken as a whole, map to a region corresponding to a copy or to a region corresponding to an original.

One form of classifier is a Bayesian classifier that is formulated based on a training set of copies and originals. This training set includes a diversity of known originals and copies that enables the regions to be defined based on a clustering of the metrics for the originals (the region in metric space representing originals) and the metrics for the copies (the region in metric space representing copies). The training process computes the metrics for each copy and original and maps them into the multi-dimensional metric space. It then forms regions for copies and originals around the clustering of the metrics for copies and originals, respectively.

In operation, the classifier maps the metrics measured from a document whose status is unknown. Based on the region into which these metrics map, the classifier classifies the document as a copy or an original. More regions can be created in the metric space if further document differentiation is desired.

Having described the entire system, we now describe a number of specific types of print structures that can be used to embed the auxiliary signal, or that can be used independently to create copy detect features.

FIG. 3, as described earlier, provides a binary representation of an auxiliary signal mapped to embedding locations on a document. One way to create this signal is to use a digital watermark generation process.

One such process is to embed a digital watermark into a block of midlevel gray values, threshold the result to binary values per embedding location, and then insert the desired print structure and property (e.g., line structure, screen, color, etc.) per embedding location based on the auxiliary signal value at that location.

In the case of a line continuity method of FIG. 4, the binary values map to the presence or absence of a line structure. An alternative is a line structure at color 1 or the same line structure at color 2, using the two colors shown in FIG. 5 to represent the binary states of the auxiliary signal. Another alternative is a screen 1 or screen 2 (at the same or different colors), to represent the binary states of the auxiliary signal. Another related example is to use different rasterization styles in different print structures. For example, one might by a clustered dot while the other is diffusion. Since counterfeiters typically use devices employing a particular type of RIP, like diffusion dither, the difference between these two print structures will change in response to copying. Combinations of the different print structures and properties can be used to represent two or more embedding states per embedding location.

As noted, the differences in the way these print structures respond to copy operations make the embedded digital watermark more readable or less readable. We use the term "nascent watermark" for a digital watermark that becomes more detectable after a copy operation. We use the term "fragile watermark" watermark for a watermark that becomes less detectable after a copy operation. While the varying responses of the print structures are useful tool for constructing an embedded machine-readable signal, such as a nascent or fragile watermark, they can also be used as measurable feature metrics apart from the embedded signal. For example, they can be used as separate print features that are measured in block 130 of FIG. 2 and input to the classifier.

In the next sections, we will discuss a number of print structures generally. They may be used as embedded signal elements and independent print features.

Colors

As noted above with reference to FIG. 5, the way in which some colors respond differently to copy operations may be used as a copy detection feature in print structures. This effect can be exploited by measuring the change in the differences between a pair of colors in response to a copying operation, such as a scan or print operation. In some cases, this difference goes from zero to some measurable non-zero amount (e.g., makes a nascent embedded signal carried in the difference value appear). In other cases, this difference goes from some non-zero amount to zero (e.g., makes a fragile embedded signal carried in the difference value disappear).

One way to use colors for copy detection is to select out of gamut inks for use in one or more of the print structures. A color gamut defines a range of colors. Different color schemes (e.g., RGB and CMY) generally include a unique color gamut. Such color schemes will most certainly have overlapping color gamuts (or ranges), and unique (or out of gamut) color ranges.

Inks or dyes can be selected that lie outside of a color gamut of a capture device (e.g., an RGB scanner) used in typically copying operations, yet fall within the gamut of the authentication scanner. Consider a document that is printed with some dark blues and violets in the CMYK space, which are out of gamut for the RGB space. When a scanner scans the CMYK document, it typically scans the image in the RGB space. The RGB scanning loses the dark blues and violets in the conversion.

This approach extends to color gamuts of printers used in counterfeiting as well. Inks can be selected that fall outside the typical gamut of CMYK printers likely used by counterfeiters.

Another approach is to use a metameric ink for one or more of the print structures. These inks look different to different types of scanners and/or lighting conditions, and therefore, lead to detectable differences in the scanner output. The differences between the authentication scanner output and the counterfeiter scanner output provide detectable differences between copies and originals. Thus, these inks are candidates for use in the print structures.

Another approach is to mix different amounts of black in one of a pair of colors. An authentication scanner that has better sensitivity to these differences will represent the differences in colors more accurately than a typical RGB scanner. The change in the luminance difference between these two colors in response to a copying operation provides another copy detection feature for the print structures.

Another approach is to use a pair of colors where one color is persistent in black and white image scans, while the other is not. Again, the change in the differences between these colors in response to a copying operation provides another copy detection feature for print structures.

More on Nascent and Fragile Watermarks

We can enhance or de-emphasize color contrast characteristics to provide improved watermarking techniques. In one implementation, we use an emphasizer (e.g., an optical filter, light source, etc.) to emphasize a predetermined color channel. A watermark hidden in the predetermined color channel is readily discernable with the emphasis. In another implementation, we use an emphasizer to de-emphasize (or wash out or reduce contrast of) a predetermined color channel in an original, but due to copier or printer characteristics, color contrast is pronounced in a copy when viewed with the emphasizer.

One inventive nascent watermark builds on the above-discussed color techniques (remember that, above, we described a "nascent" watermark to include a digital watermark that becomes more detectable after a copy operation).

We begin with a brief discussion of a "typical" counterfeiting scenario. A counterfeiter typically scans an original color document with an RGB scanner, resulting in a captured image of the original color document. The counterfeiter will then, perhaps after digitally massaging the captured color document, print the captured color document using a color printer, e.g., a process color (e.g., CMY or CMYK) printer.

We provide a nascent digital watermark that becomes more detectable in a copy made, e.g., according to the above typical counterfeit scenario.

We select a so-called "spot color" whose process color (e.g., CMYK or CMY) equivalent is out-of-gamut with respect to the spot color. In other words, the spot color is outside the process color gamut. The closest process color equivalent (e.g., a CMYK equivalent) to the spot color then shows a discernable color shift with respect to the spot color. For example, consider the illustrations of FIGS. 6a and 6b. FIGS. 6a approximates a slice through a color gamut that is perceptible to a human (at a selected luminance). The small circle in FIG. 6a illustrates the placement of the example spot color within this gamut. The circle noticeably shifts in the color space when approximated with a process color (CMYK), as shown in FIG. 6b. In other words, the closest process color approximation of the FIG. 6a spot color results in a discernable color shift (FIG. 6b). (While we are using Pantone®'s 1505 spot color to illustrate the color shift, it will be appreciated that many, many different spot colors can be used with our inventive processes and watermarking techniques.).

Figure 7:
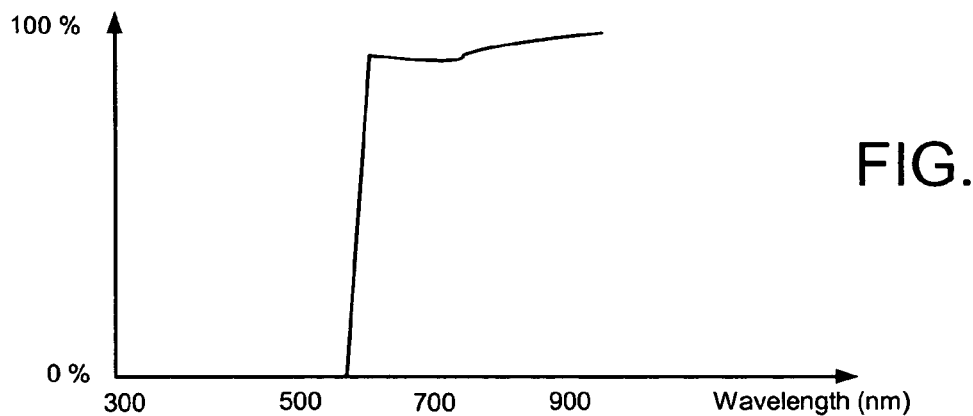
FIG. 7 illustrates a spectral response for the FIG. 6*a* spot color.

Our selected spot color is realized with ink including spectral characteristics as approximated in FIG. 7.

We provide a filter (e.g., an optical filter) including transmission characteristics (FIG. 8) that are approximately matched to (e.g., has a similar shape of) the spot color's spectral characteristics (FIG. 7). Individually, the particular spot color ink and filter characteristics (or transmission shape) are not terribly significant. What is important, however, is that the filter is matched to (or approximates) the ink's spectral characteristics.

When the spot color ink is viewed through the filter, the spot color ink is not discernable against, e.g., a white background. Essentially, the interference filter interferes with (e.g., washes out or reduces contrast of) transmission of the spot color ink. Thus, the spot color is substantially visually imperceptible when viewed with the filter against a white background.

If we then embed a digital watermark using the spot colored ink, the spot color will not generally be detectable in an original printed document when viewed through the filter.

Figure 8:
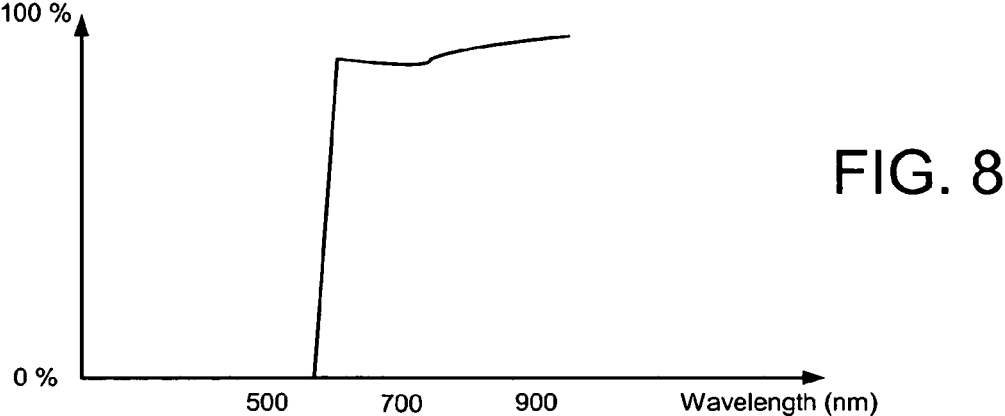
FIG. 8 illustrates transmission characteristics for a filter matched to the FIG. 7 spot color.
Figure 9:
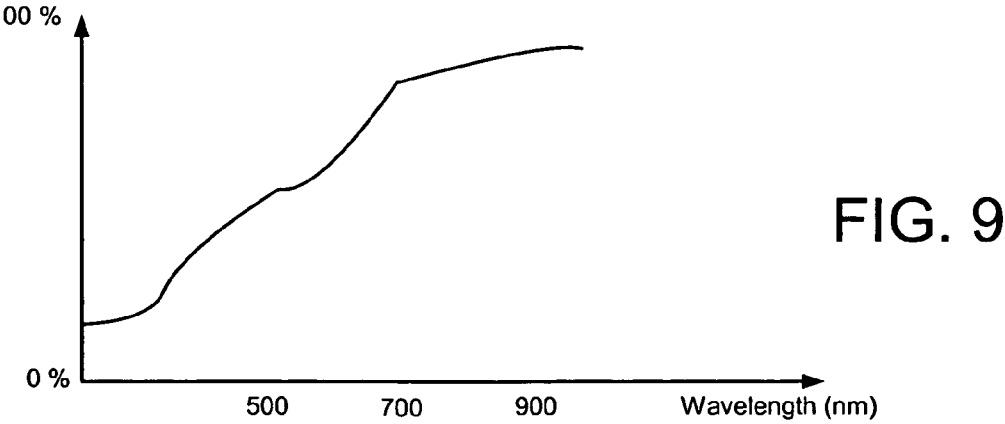
FIG. 9 illustrates a spectral response for the process color approximation of FIG. 6*b*.

The watermark will be detectable, however, when viewing a copy or counterfeit with the same filter of FIG. 8. Remember that a copy will typically be reproduced with process colors (e.g., CMY or CMYK). And, if the original spot color is chosen to be outside of the process color gamut, then the closest process color equivalent to the spot color will show a color shift as in FIGS. 6a and 6b. This process color includes a spectral response as approximated in FIG. 9. Since the spectral response of the filter (FIG. 8) no longer matches that of the process color approximation (FIG. 9), e.g., the filter will no longer "wash out" or reduce contrast of the color, and instead the color will exhibit a pronounced contrast against a lighter or white background, the CMYK (cyan, magenta, yellow, and black) approximation in the copy becomes visible when viewed with the filter. So if a watermark is represented in a copy via the process color approximation, then the watermark will be visible when viewed (e.g., with a monochrome sensor) through the filter. Hence, we provide a nascent watermark. (We note that the process color equivalent in FIG. 9 is the best spectral match that is possible with process color inks for the selected spot color. A nascent watermark will become even more pronounced in a copy when the process colors are not the "best.").

Figure 22:
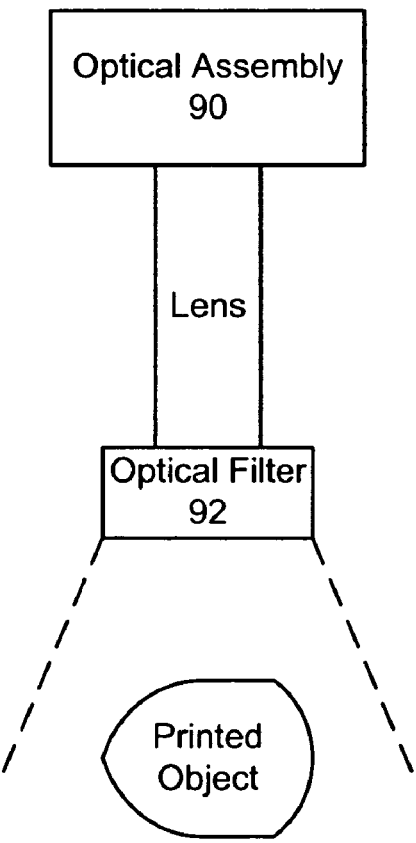
FIG. 22 illustrates a block diagram of one example-imaging environment.

With reference to FIG. 22, we provide an optical assembly 90 (e.g., including a lens and imagining sensor) with an optical filter 92. For example, the optical filter may include an interference filter or notch filter including the transmission characteristics approximated in FIG. 8. Filters are available from a variety of vendors including, e.g., Barr Associates headquartered in Westford, Mass., USA, among many other vendors. The optical assembly may include a monochrome sensor or CCD camera. An original or a copy of an original are imaged via the optical assembly 90 fitted with the optical filter 92. The image is analyzed, e.g., by digital watermark detecting software. The software can be stored in memory for execution by electronic processing circuitry. Watermark contrast is detected in the copy, but the watermark goes substantially undetected in the original.

Nascent Watermarks, e.g., as Applied to Line Continuity Modulation (LCM)

Figure 10:
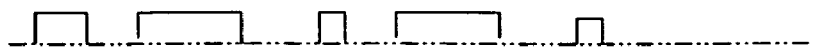
FIG. 10 illustrates line continuity modulation-type watermarking for a single color channel.

We discussed LCM watermarking above with reference to FIGS. 3 and 4. We can apply our spot color/filter nascent watermarking to LCM-based watermarks as well. With reference to FIG. 10, we lay down a LCM watermark with a selected spot color ink. The spot color is preferably out-of-gamut with respect to its-closest process color approximation. The LCM nascent watermark is imperceptible (or perhaps just faintly perceptible) when viewed through a matched, interference filter (e.g., an optical filter). In contrast, however, the LCM nascent watermark is perceptible and machine readable in a process color copy.

EXAMPLE

Pantone® 246

Another example is presented with respect to FIGS. 11-13 and 18. We embed a LCM digital watermark signal in an original document using a predetermined spot color ink. In this example, the spot color ink is Pantone's® 246 spot color. (Of course there are many other spot colors that can be suitably interchanged with this aspect of the invention. Accordingly, this and other specific examples should not be viewed as limiting the present invention.) The Pantone® 246 spot color includes a spectral response as approximated in FIG. 12a. Our emphasizer in this example includes a Notch Filter (FIG. 11a). More specifically, the Notch Filter includes about a 488 nm notch. A broadband light source is preferably used with the FIG. 11a notch filter, with resulting characteristics as shown in FIG. 11b. With this broadband illumination, the Pantone® 246 dye includes low absorption, since the FIG. 11b notch filter matches the transmission of the dye. But the closest process color (PC) equivalent to Pantone 246 (see FIG. 12b for the PC 246 spectral response) will have relatively high absorption, since PC 246 has high absorption in blue and red, and since the illumination does not match the transmission of the process color.

Figure 11A:
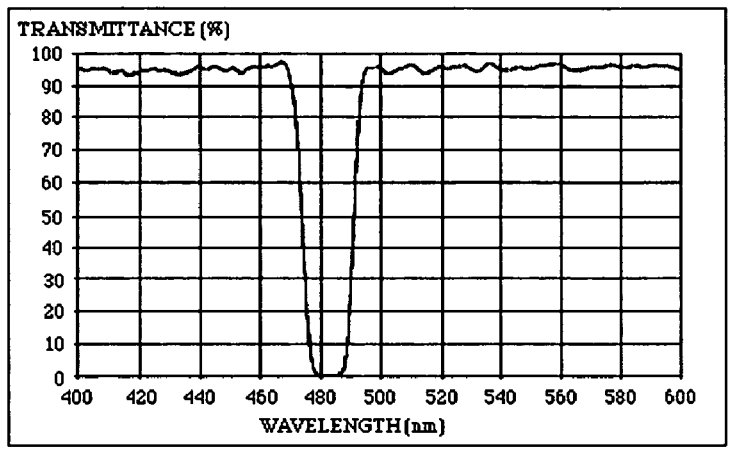
FIG. 11a illustrates transmittance characteristics of a notch filter.
Figure 11B:
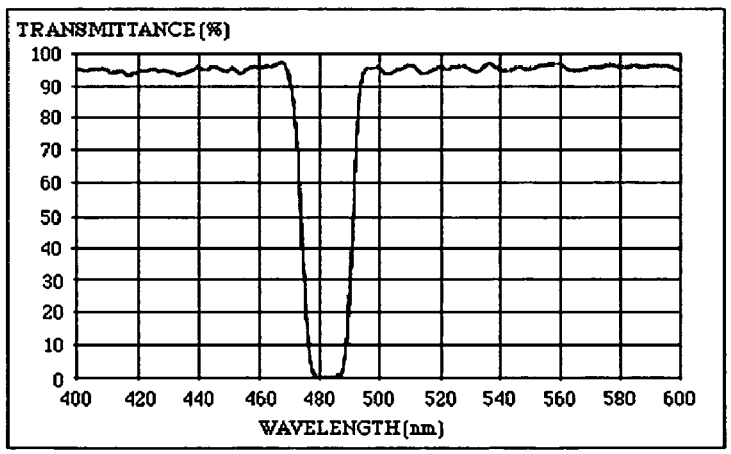
FIG. 11b illustrates broadband illumination with the FIG. 11a notch filter.

A watermark printed in Pantone 246 and illuminated with a broadband source and notch filter as shown in FIG. 11b will result in a relatively low contrast image, e.g., a watermark signal includes a relatively low contrast in comparison to a white background (see FIG. 13a). However, when an original printed document that includes a watermark is counterfeited with process colors, and when the counterfeit is illuminated with a broadband source and notch filter (FIG. 11b), the result is a relatively high contrast image (see FIG. 13b). Thus, good contrast separation can be obtained between an original and counterfeit. (We have intentionally illustrated a case in FIG. 13a where the watermark is slightly detectable in an original. A machine reading of the FIG. 13a watermark may be able to detect the watermark, but perhaps below a predetermined contrast or metric level. In some implementations the watermark will not be detectable, or will be so faint as to not yield a reliable machine-read.)

Figure 18A:
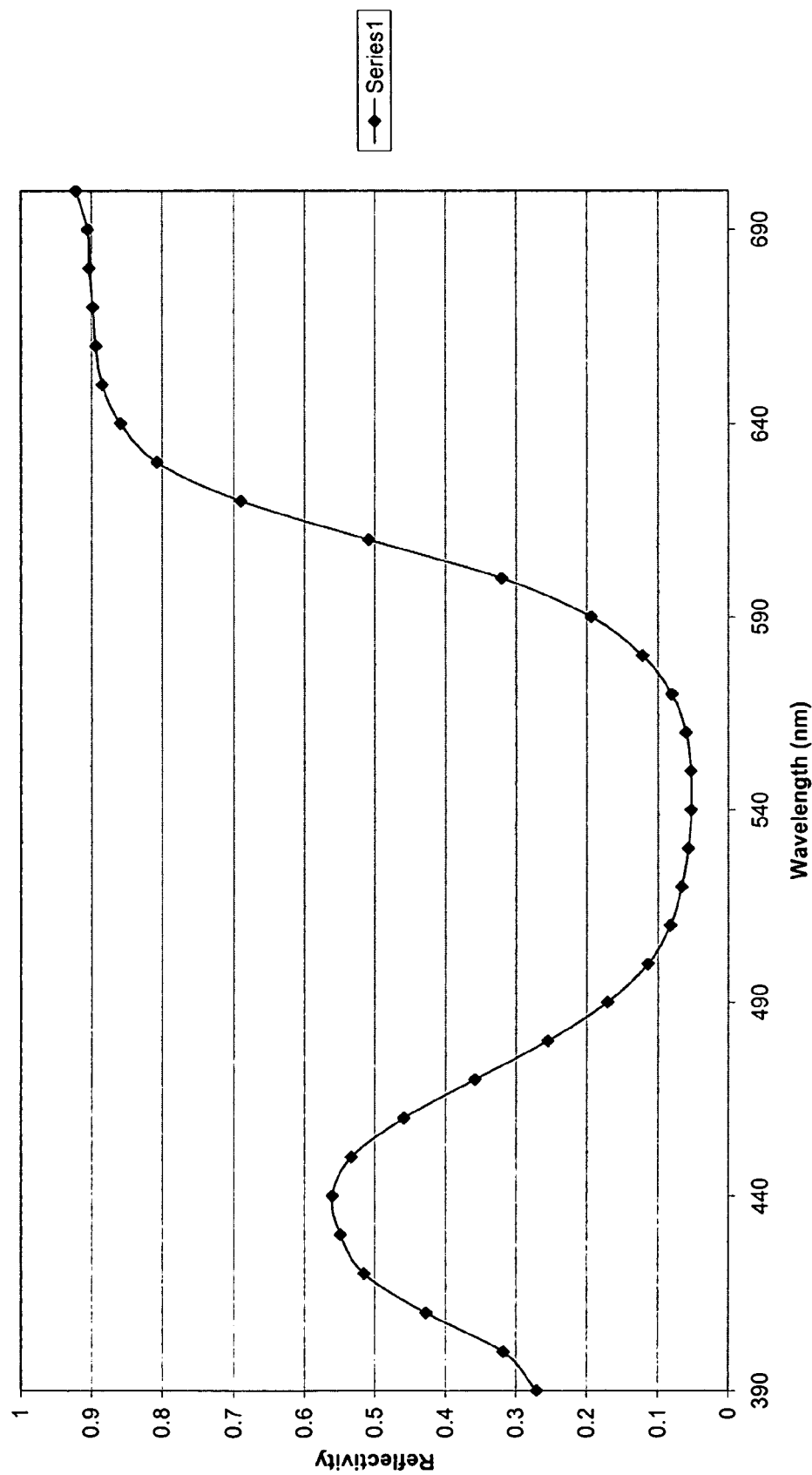
Figure 18B:
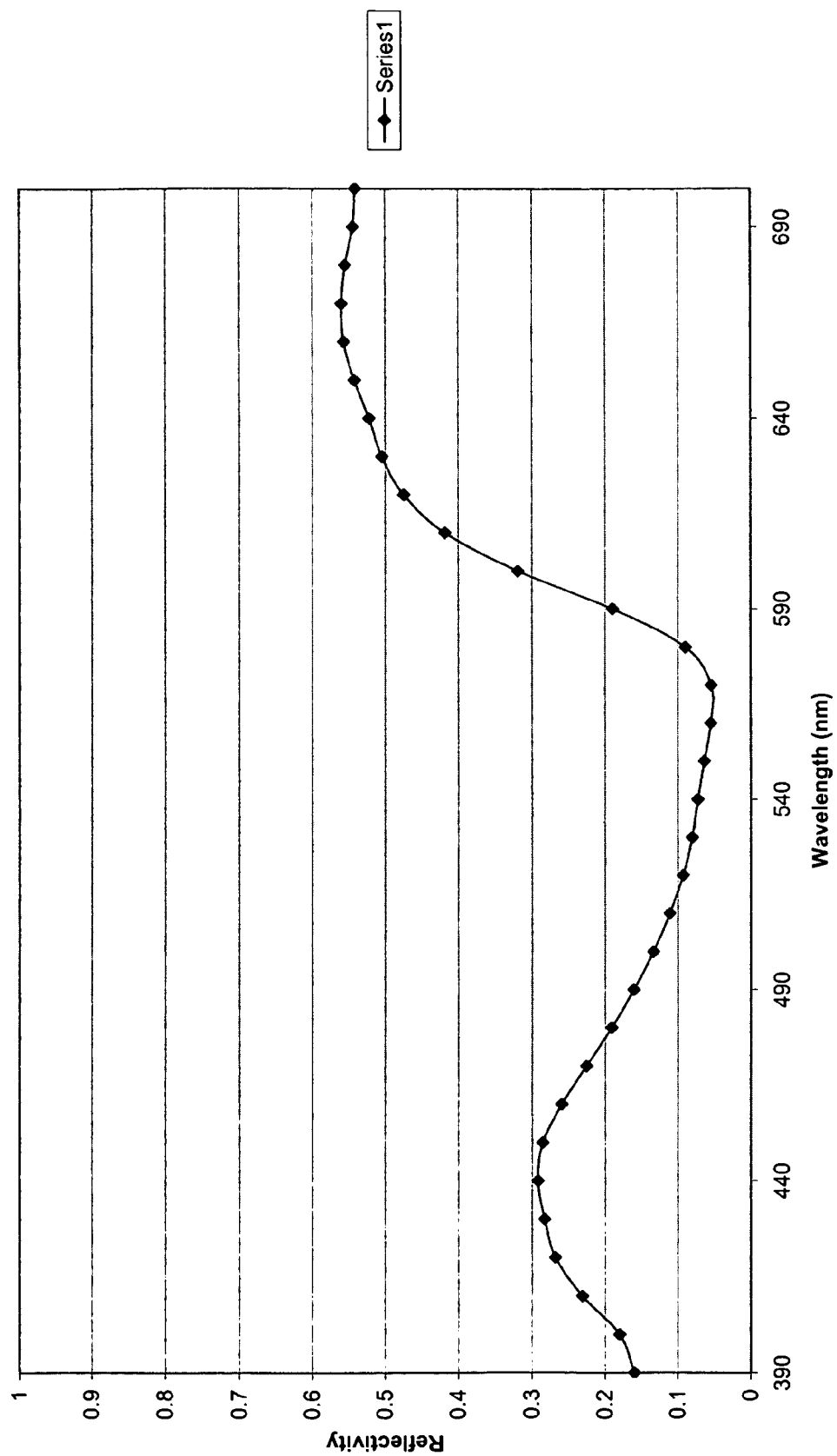
Figure 18C:
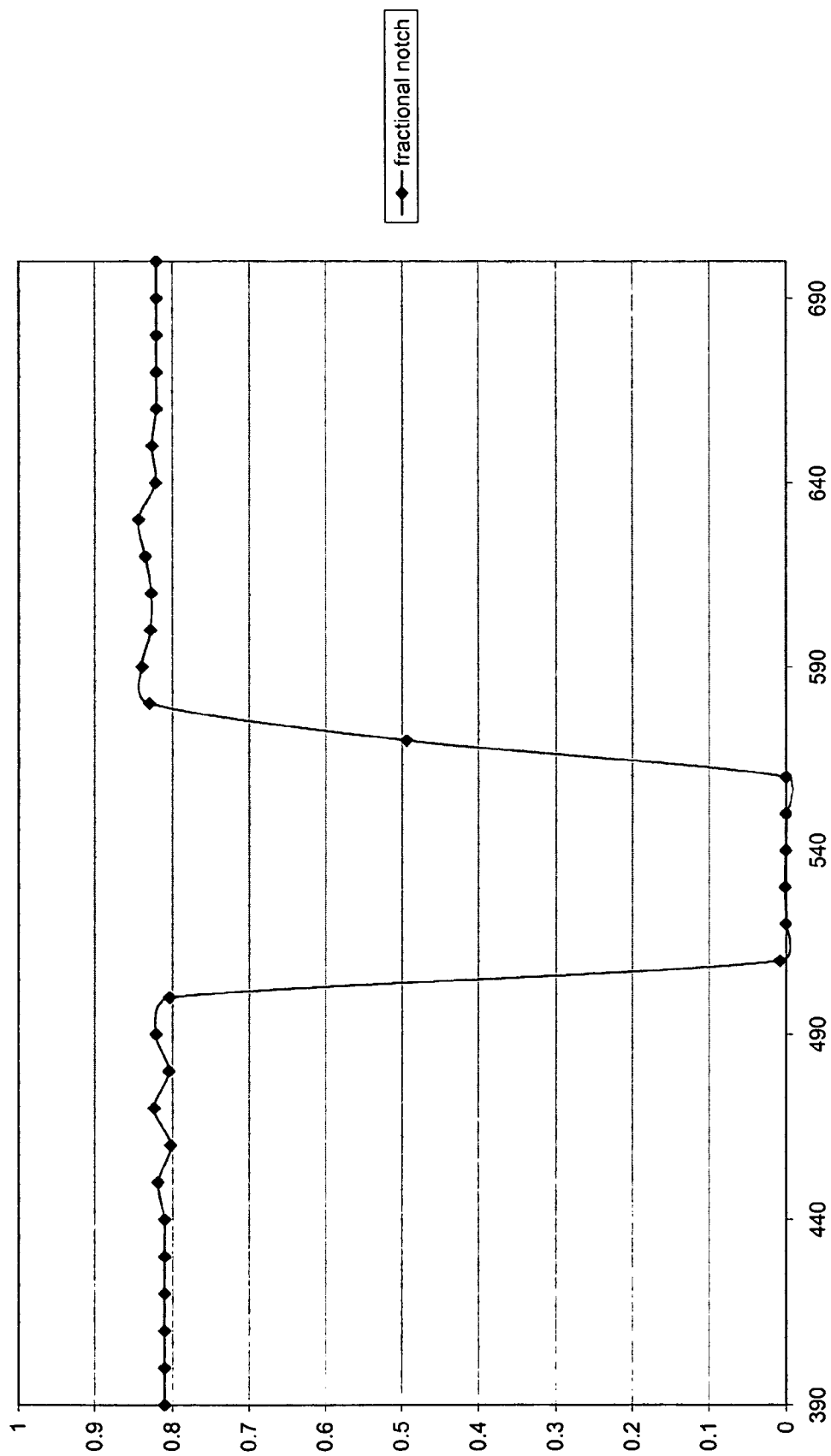
Figure 18D:
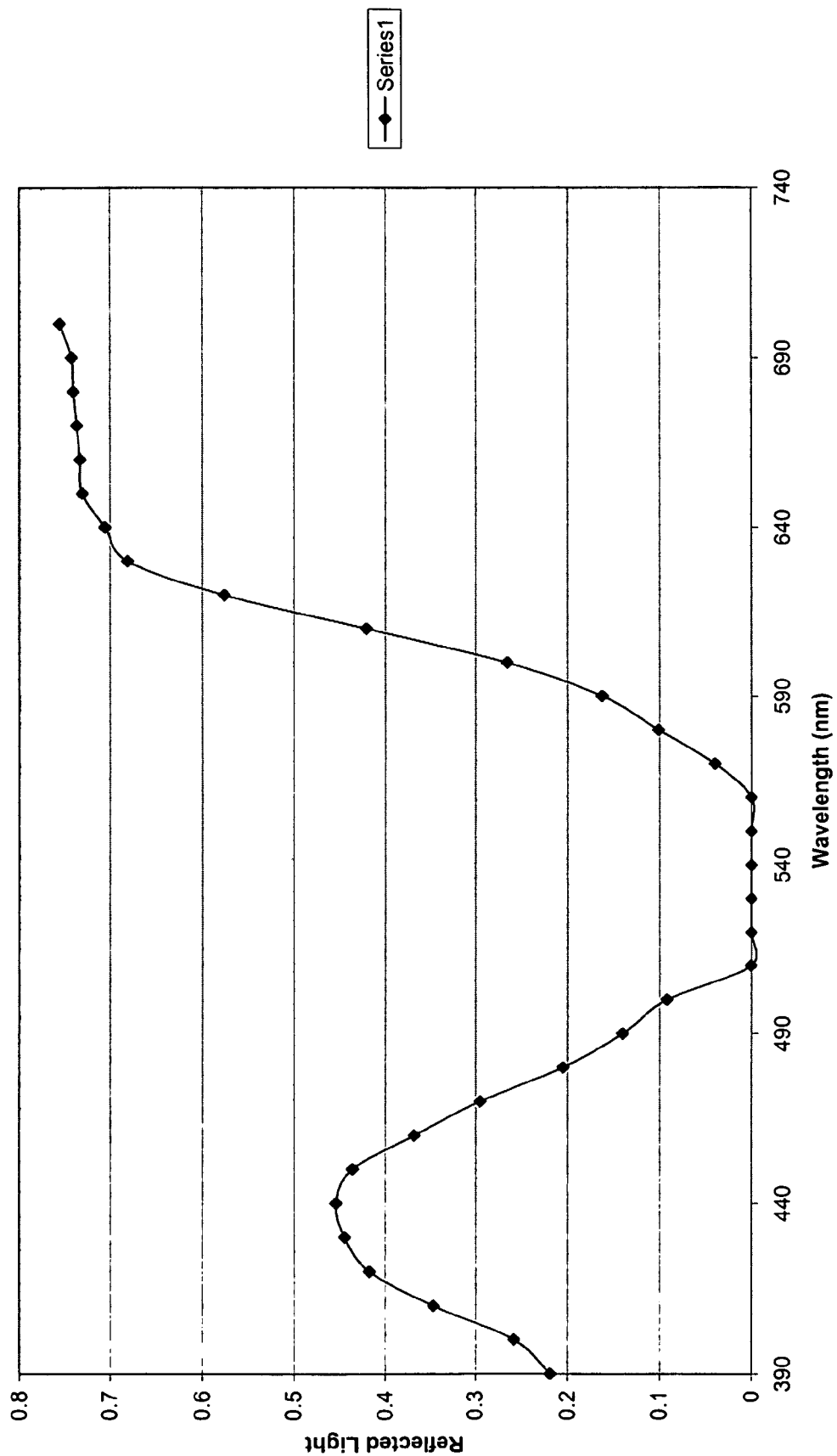

(FIGS. 18a-18f supplement this example. FIG. 18a shows the spectral response of Pantone 246; FIG. 18b shows a spectral response of a process color ("PC") approximation of Pantone 246 (hereafter "PC 246"); FIG. 18c shows a Notch Filter Reflectivity; FIG. 18d shows a reflected light response of the Pantone 246 when viewed with the notch filter of FIG. 18c, in terms of wavelength; and FIG. 18e shows a reflected light response of the PC 246 when viewed with the notch filter of FIG. 18c, in terms of wavelength. When using a Modulation Contrast formula defined by: (Lmax−Lmin)/(Lmax+ Lmin), wherein Lmax is maximum reflected light (i.e., as shown in FIGS. 18d and 18e), and Lmin is minimum reflected light (i.e., as shown in FIGS. 18d and 18e), we obtain for this example a modulation contrast for the original of 0.309473899; and a modulation contrast for a counterfeit of 0.499962316, with an original to counterfeit ratio of 1.615523372. The reflected light values in this simulation are shown in the table of FIG. 18f.).

To deter a counterfeiter from reducing concentration of spot color ink, in order to avoid a watermark being read (thus perhaps fooling a watermark detector that a counterfeit is really an original), text, symbol or machine-readable code can be added to the original indicating that a texture (e.g., a watermark tint), text or symbol should be visible to a human observer within a predetermined area of the original document.

While some of our techniques have been described as using LCM based watermarking techniques, the present invention is not so limited. Indeed, our color contrast techniques can be applied to many other types of digital watermarking and steganographic signal hiding as well.

Fragile Watermark Using Two Spot Color Inks
Single Channel Watermark

With reference to FIG. 14, we can provide a so-called fragile watermark using two or more spot color inks. As discussed above, we use the term "fragile watermark" for a watermark that becomes less detectable after a copy operation.

Some care is needed when selecting spot Color 1 and spot Color 2. The criteria should be that Color 1 and Color 2 have process color (PC) equivalents that are about visually equal, or at least very close. Indeed, it is more important for the process color equivalents to be approximately equal than it is for spot Color 1 and spot Color 2 to be visually equal.

We combine Color 1 and Color 2 in an original document. We provide a filter matched to the spectral response of one of the spot colors (say, for example, Color 1). When the original document is viewed through the matched interference filter, only Color 2 is visually perceptible, since the interference filter washes out or reduces contrast of Color 1. Thus we can convey a watermark signal (e.g., a LCM signal) through the Color 2 channel, which is detectable in the original document.

The watermark becomes less detectable in a copy. Remember that we selected the two spot colors because they have close process color equivalents. The filter is not matched with the process color approximation of the Color 1 channel. And since the two process colors are visually similar, the Color 1 process color approximation and the Color 2 process color approximation will have about the same contrast characteristics when viewed through the filter. The reflected light from both the Color 1 channel and the Color 2 channel will have about the same contrast in comparison to a white background. Thus, the watermark will be harder—if at all possible—to detect.

Multiple Watermarks in Different Color Channels

In some implementations we convey two watermarks (e.g., one fragile and one nascent), one in each of a color 1 channel and in a color 2 channel. In this case, color 1 is preferably matched to, e.g., an interference filter or the FIG. 11b Notch Filter with illumination, so that the watermark is less detectable in an original but appears more pronounced in the counterfeit (e.g., a nascent watermark). Color 2 is chosen so that its spectra response is inversely related to the transmission properties of the selected filter. Thus, the color 2 watermark provides high contrast (e.g., the watermark is detectable when viewed through the filter) on the original but substantially disappears (or appears with less contrast) on a counterfeit. The watermarks can include different messages and/or orientation components to help distinguish them from one another. The watermarks can be interleaved or placed in the same spatial area on an original document. A combination of an appearing and a disappearing watermark in the same spatial region combats an attack where a counterfeiter tries to change the color contrast of a scanned image to make a watermark either appear or disappear. Increasing contrast on a counterfeit would tend to make a watermark in both colors appear, so the presence of at least the watermark in color 1 signals a counterfeit. Similarly, decreasing contrast on the counterfeit tends to make the watermark in both colors disappear, so the absence of at least the watermark in color 1 signals a counterfeit.

EXAMPLE

Pantone 7488

Figure 16A:
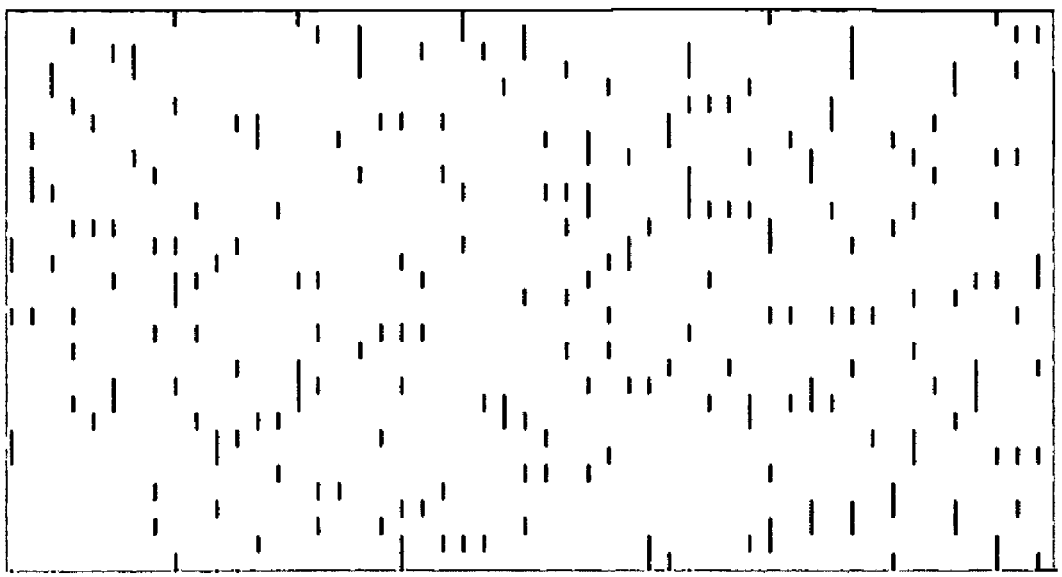
FIG. 16a illustrates relative detectability of a fragile watermark in an original.
Figure 16B:
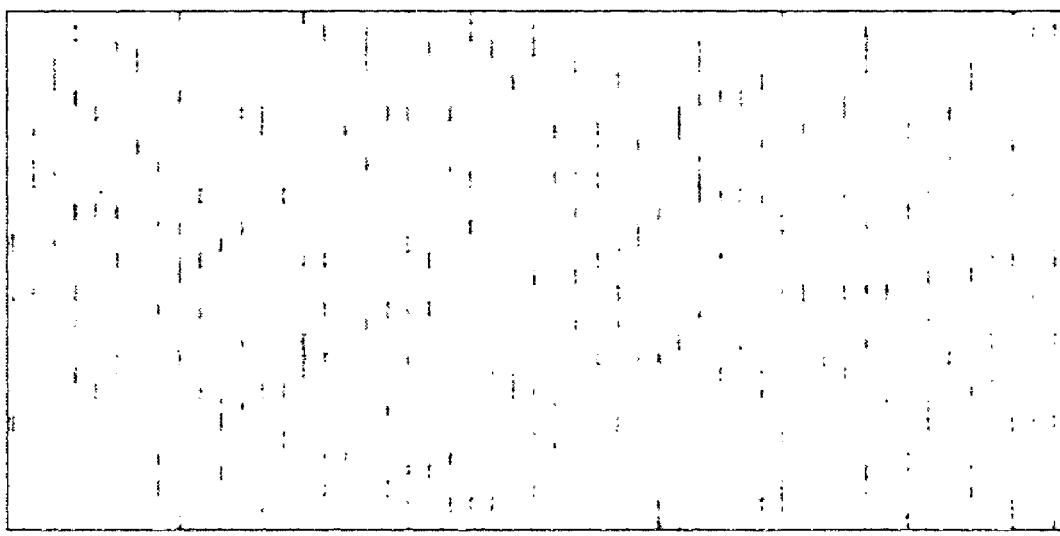
FIG. 16b illustrates relative detectability of the FIG. 16a fragile watermark in a counterfeit.

We provide additional examples with reference to FIGS. 15, 16 and 19. We select a spot color with a spectral response (FIG. 15*a*) that is approximately inversely related to the notch filter (see FIG. 11*b*). (This selected spot color corresponds to the inverse color 2 discussed above.) For example, we select Pantone 7488. Under the notch filter illumination, the Pantone 7488 ink has high absorption, since the illumination is the inverse of the transmission of the dye. In contrast, the closest process color (PC) equivalent to Pantone 7488 includes a relatively low absorption, since PC 7488 has higher transmission in blue and red (see FIG. 15*b*). A watermark printed in Pantone 7488 and viewed with the FIG. 11*b* notch filter will result in a relatively high contrast image (see FIG. 16*a*), e.g., the watermark is detectable in an original. However when the original is counterfeited with process color ink, and when the process color ink is illuminated with the FIG. 11*b* Notch Filter, the result is a relatively low contrast image (see FIG. 16*b*). Thus good separation can be obtained between an original and counterfeit when using Pantone 7488 to create a fragile watermark that is less detectable in a counterfeit. (We have intentionally illustrated a case in FIG. 16*b* where the watermark is slightly detectable in a copy. A machine reading of the FIG. 16*b* copy may be able to detect the watermark, but perhaps below a predetermined contrast or metric level. In some implementations the watermark will not be detectable, or will be so faint as to not yield a reliable machine-read.)

Figure 19A:
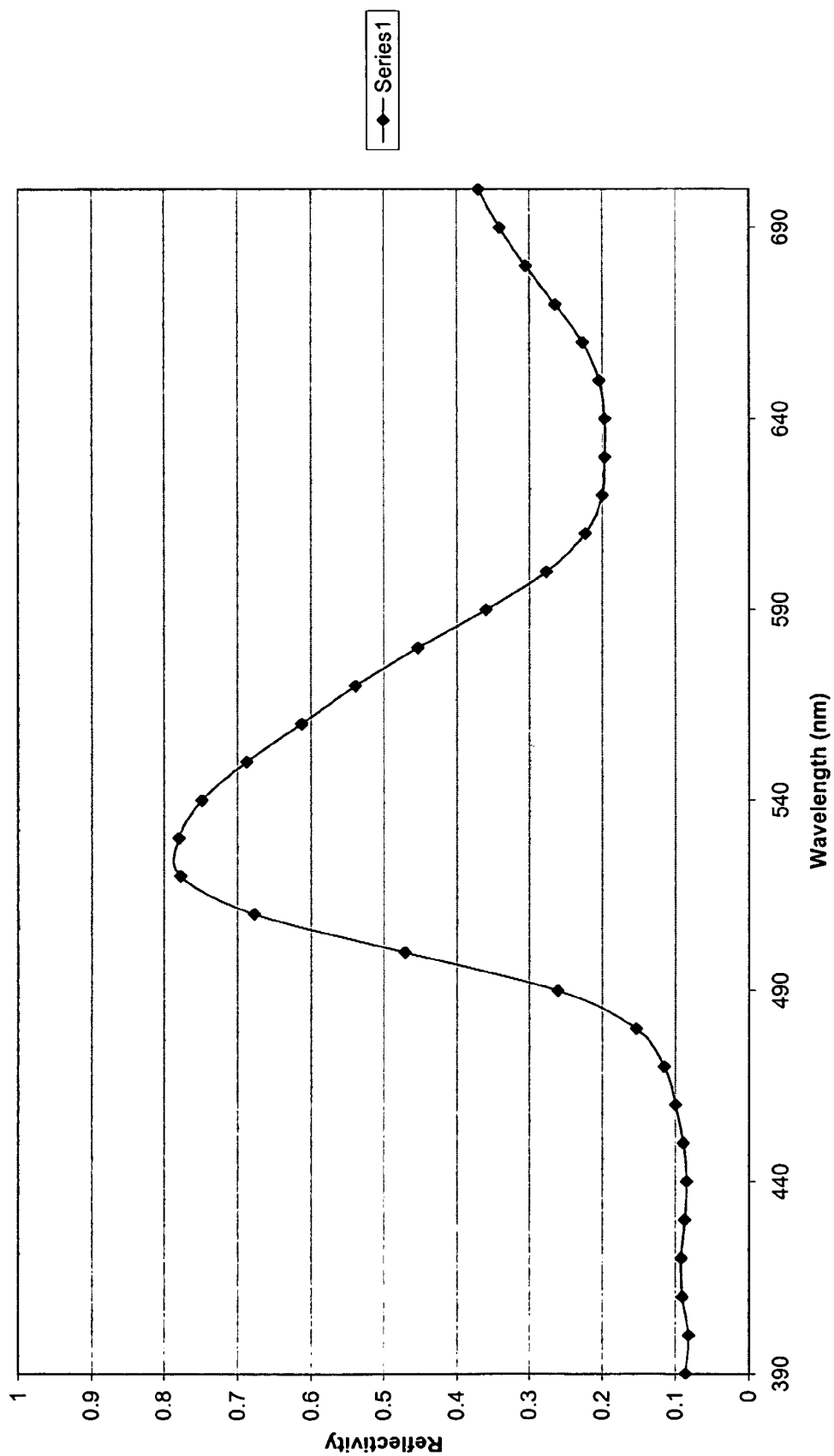
Figure 19C:
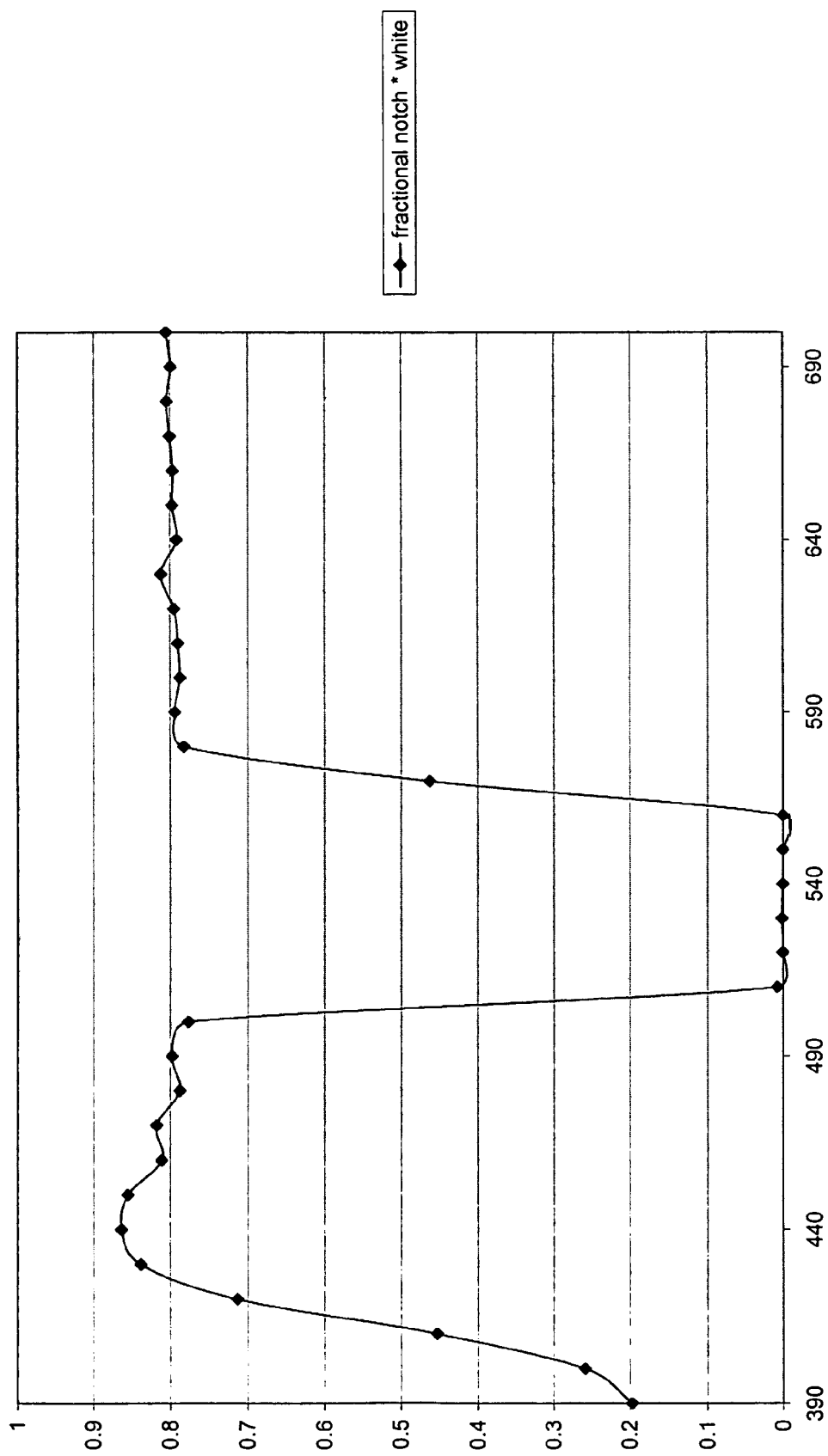
Figure 19D:
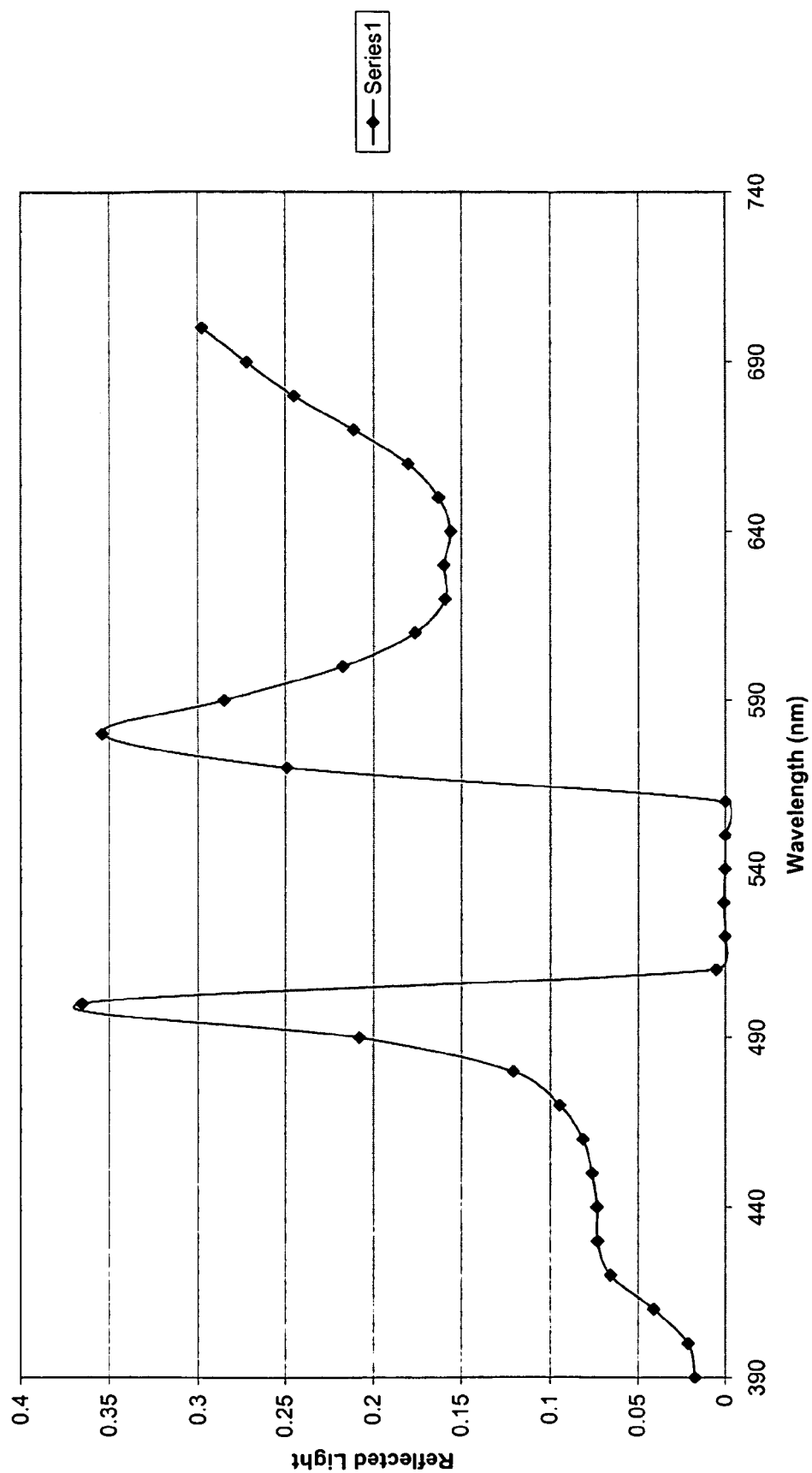
Figure 19E:
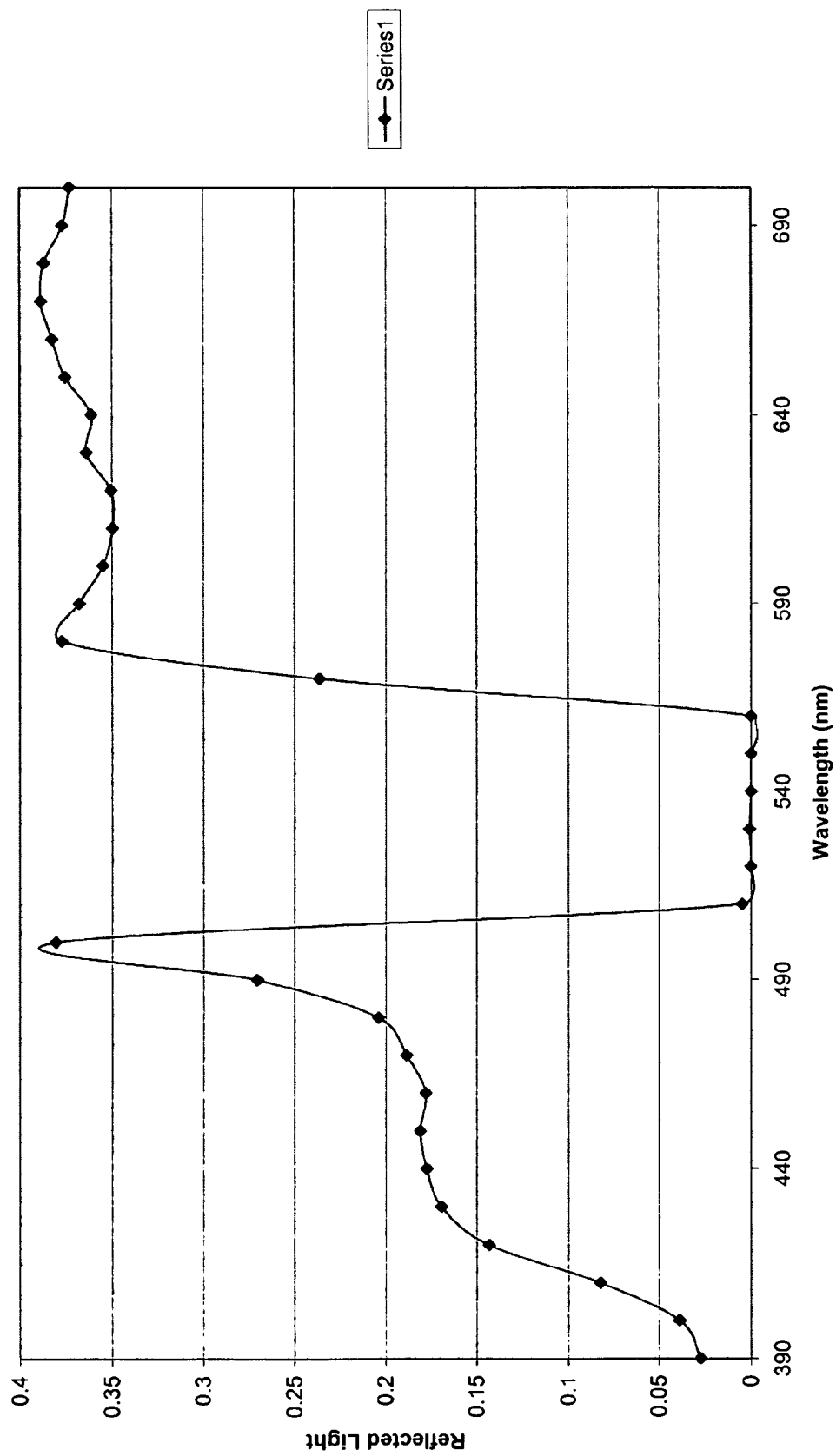

(FIGS. 19*a*-19*g* supplement this example. FIG. 19*a* shows the spectral response of Pantone 7488; FIG. 19*b* shows a spectral response of a process color ("PC") approximation of Pantone 7488 (hereafter "PC 7488"); FIG. 19*c* shows Notch Filter Reflectivity; FIG. 19*d* shows a reflected light response of the Pantone 7488 when viewed with the notch filter of FIG. 19*c*, in terms of wavelength; and FIG. 19*e* shows the reflected light of the PC 7488 when viewed with the notch filter of FIG. 19*c*, in terms of wavelength. When using a Modulation Contrast formula defined by: (Lmax−Lmin)/(Lmax+Lmin), wherein Lmax is maximum reflected light (i.e., as shown in FIGS. 19*d* and 19*e*), and Lmin is minimum reflected light (i.e., as shown in FIGS. 19*d* and 19*e*), we obtain for this example a modulation contrast for the original of 0.626085434; and a modulation contrast for a counterfeit of 0.45639718, with an original to counterfeit ratio of 1.37179952. The reflected light values in this simulation are shown in the table of FIG. 19*f*.).

Visible Mark

A human readable mark can alternatively be printed using two noise patterns in a color 1 channel and a color 2 channel. The two noise patterns are preferably designed to display text that says, e.g., 'Copy' in Color 1, and 'Original' in Color 2. The mark is preferably imperceptible under normal viewing conditions. When an original document is viewed through an appropriate emphasizer (e.g., an interference filter, notch filter or LED illumination), color 2 shows as high contrast and color 1 as low contrast. Thus the pattern that says 'Original' is seen. When a process color counterfeit of the document is viewed through the emphasizer, color 2 shows as low contrast and color 1 as high contrast. Thus the pattern that says 'Copy' is seen. In an alternative implementation, we provide a symbol, e.g., a barcode (like a one or two-dimensional barcode), a mark (e.g., like an "X" via a color counterfeit channel and a "√" via the color original channel) or an orientation fiducial, instead of the text.

Providing Contrast with Illumination

Some of the above techniques use filters for emphasizing color contrast. These filters often emphasize or de-emphasize color contrast to help detect or wash out a watermark signal. Instead of a filter, we can emphasize color contrast through selective illumination.

Figure 17:
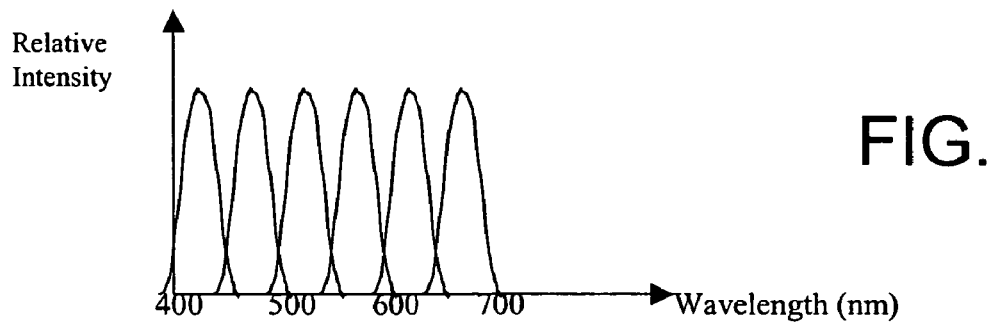
FIG. 17 illustrates relative intensities for a set of primary illumination sources.

We provide selective illumination to achieve an interference (or contrast enhancing) spectral response using a set of light emitting diodes (LEDS) with predetermined relative intensities so that their sum approximates a desired spectral response. Any spectral distribution can be approximated using a set of colored LED's. Three LED's (red, green and blue) can be used in an analogous manner as to the phosphors on a color television display to approximate a desired spectral distribution (or color). To accurately render a spectral distribution, especially colors outside of the CMYK gamut, a larger number of LEDS can be used. Six LED's which cover the visible range from 400 to 700 nm with a bandwidth ~50 nm are sufficient (see FIG. 17) to accurately recreate the spectral distribution for practically any dye. The weighted sum of the six LED primaries is used to accurately recreate the spectral distribution of the dye being matched. The weightings required to accurately match a particular dye are pre-calculated, e.g., by varying the weights and using a least squares fit to the measured dye spectra. A better approximation is obtained with 6 LED's (red, orange, yellow, green, cyan and blue), which span a larger color gamut, and can more accurately match colors outside of the CMYK gamut. The set of LED's can be electronically controlled to match any required spectral distribution, so that the same reader can be used to detect counterfeits of just about any color.

In some implementations a watermark includes information regarding a predetermined illumination. A watermark reader illuminates a document with white light to first detect a watermark. A recovered watermark (e.g., a watermark payload) is used to look up relative weightings for optimal LED illumination, and the LED illumination is altered to match a color that is being detected. A counterfeit can then be detected in ways similar to those described above.

Nascent Watermark Detected Via Selective Illumination

We provide a nascent watermark in a first example to illustrate these illumination techniques. A watermark signal is laid down in an original with a first spot color ink. The watermark is preferably undetectable or at least relatively subtle in the original when illuminated with corresponding or matched light. The watermark is detectable, however, in a process color counterfeit illuminated with the same light.

Figure 20A:
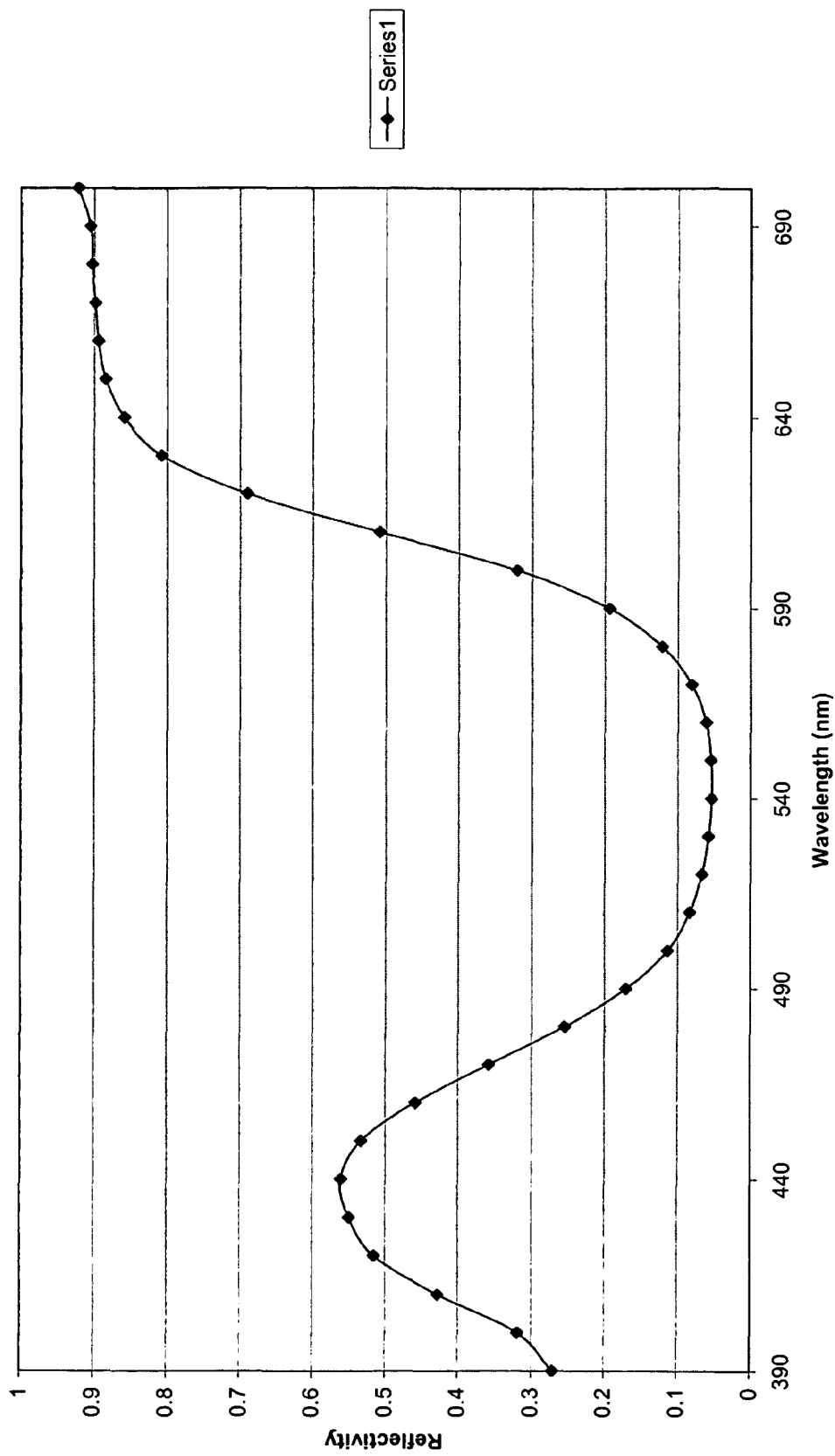
Figure 20B:
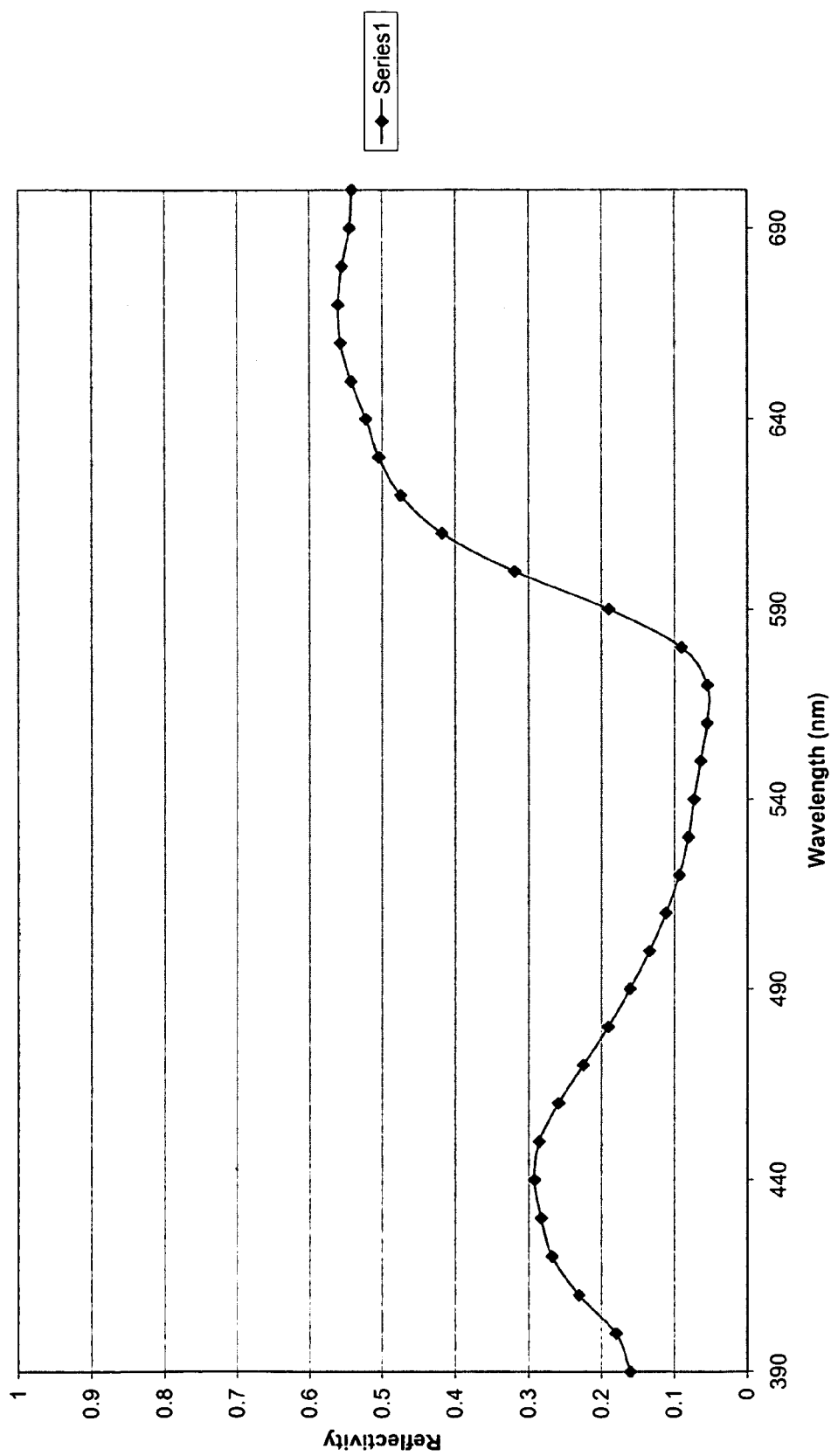
Figure 20C:
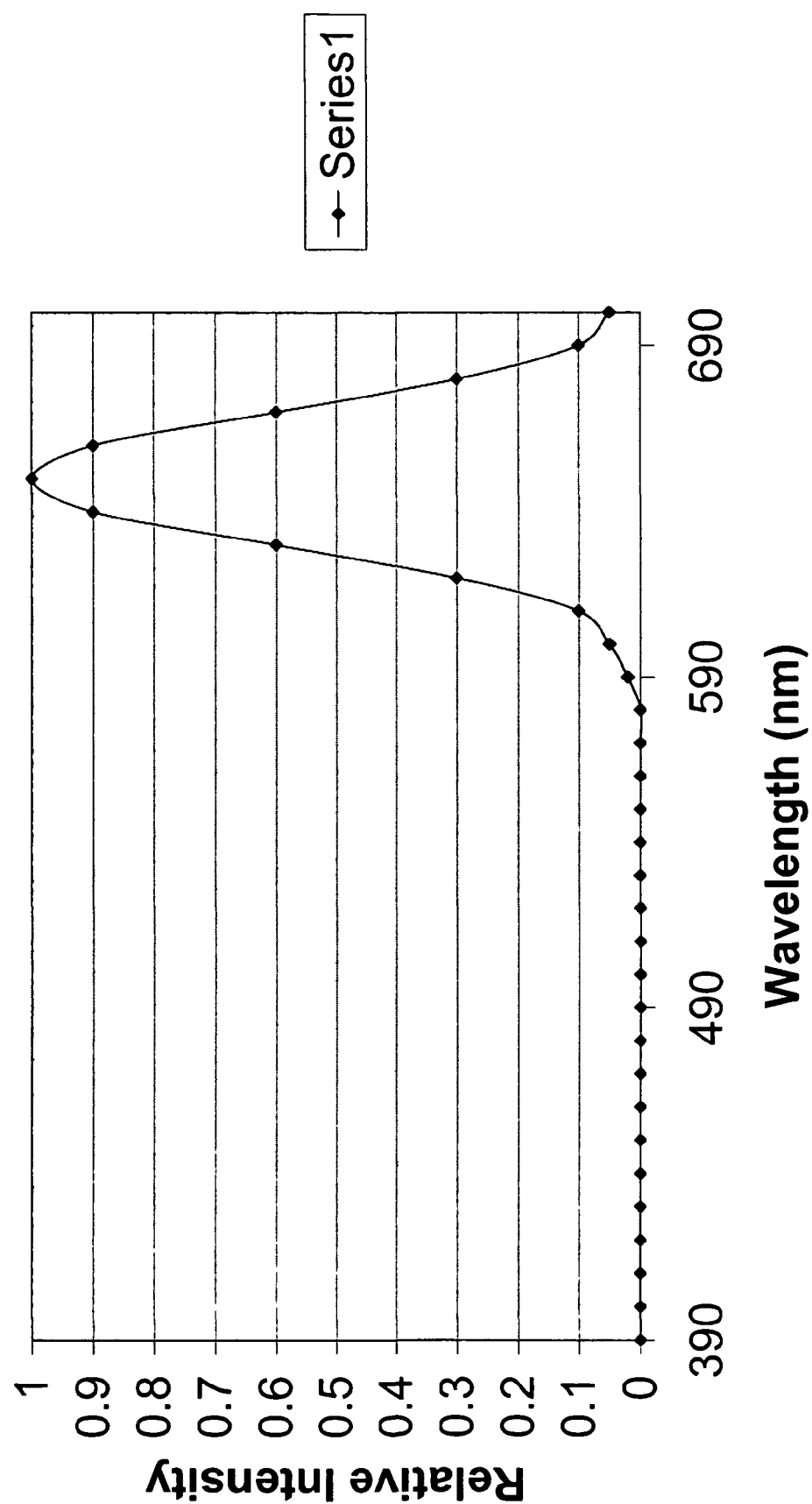
Figure 20D:
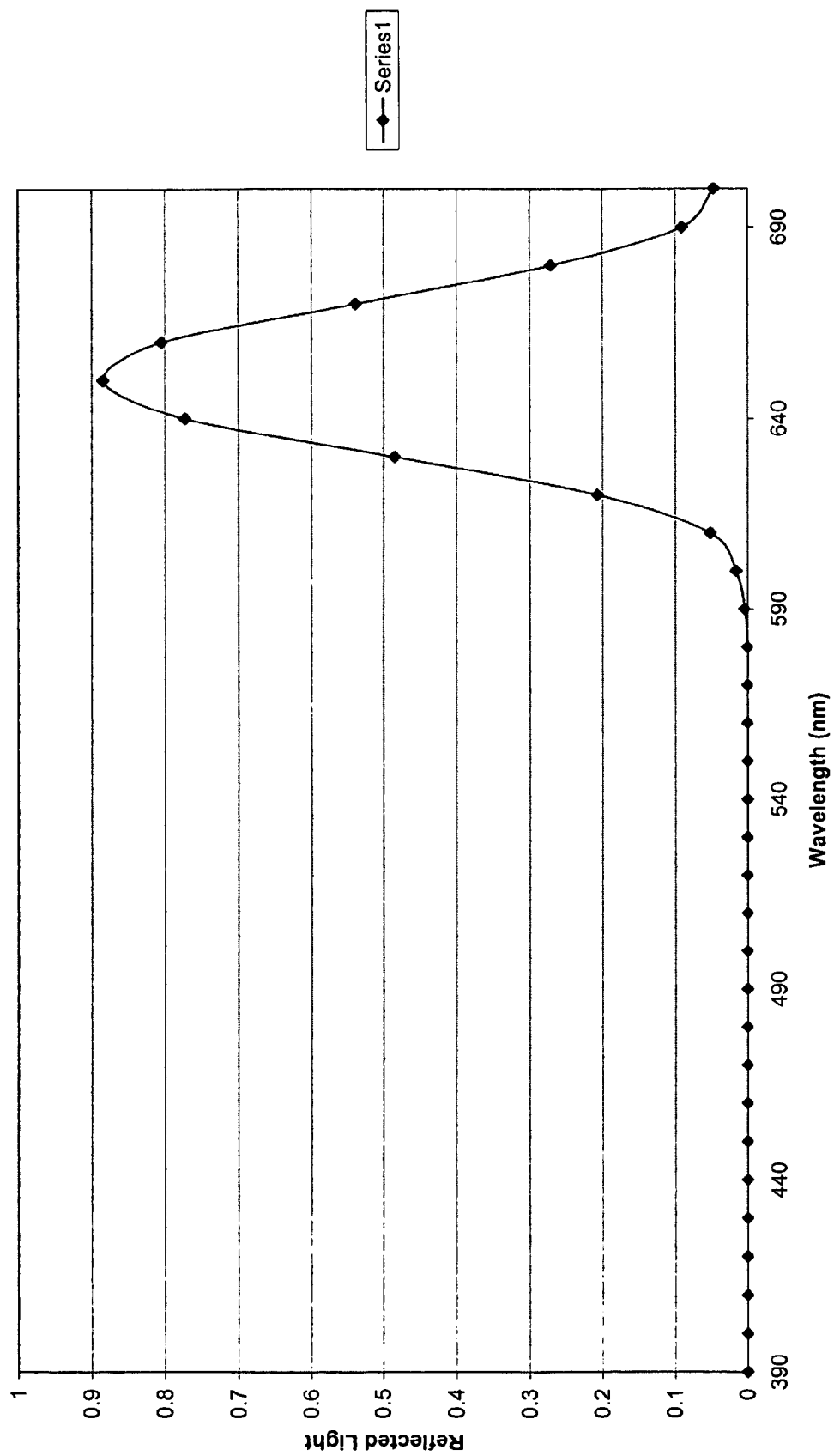
Figure 20E:
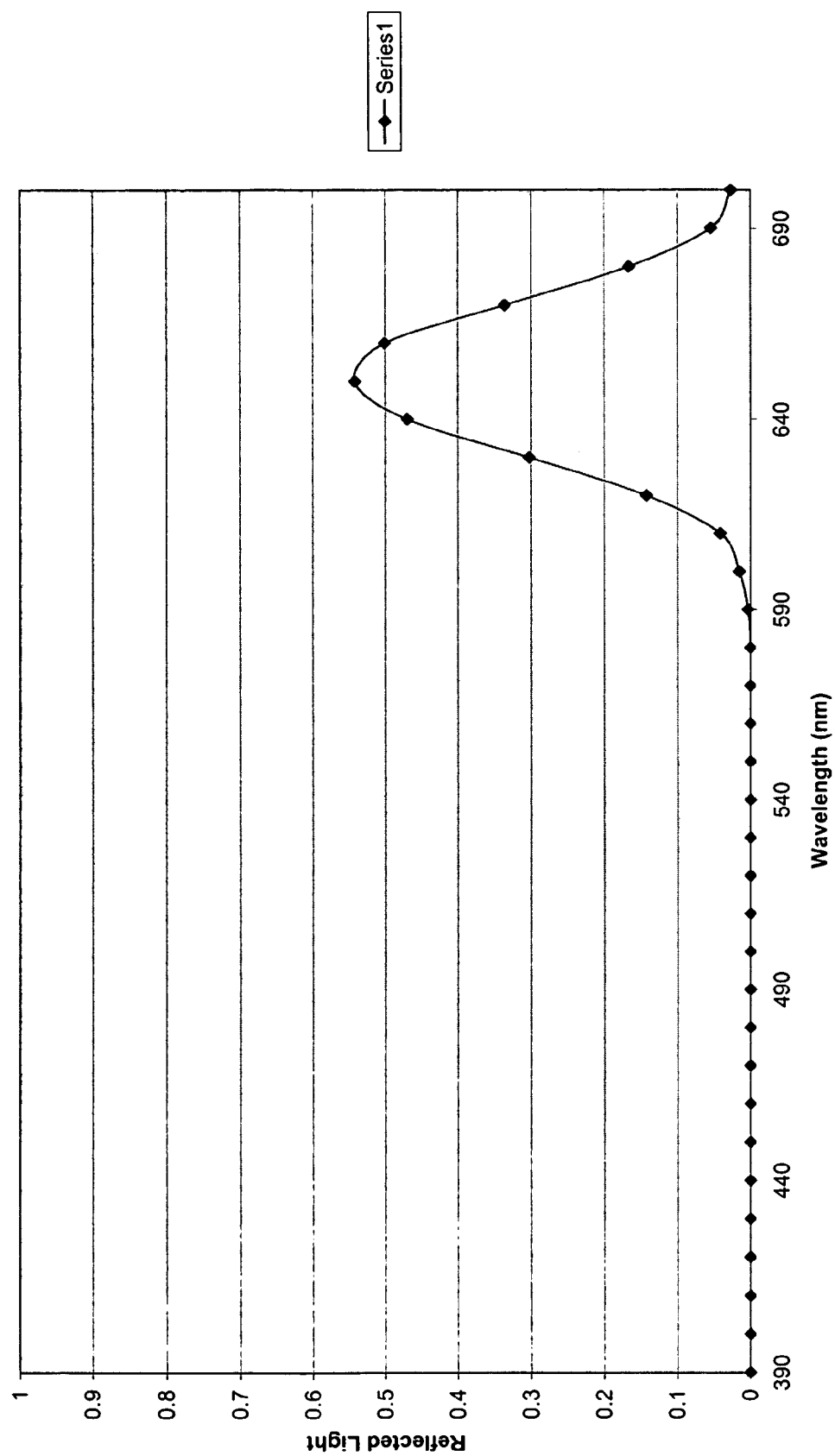

(FIGS. 20*a*-20*f* provide a further example. FIG. 20*a* shows the spectral response of Pantone 246; FIG. 20*b* shows a spectral response of a process color ("PC") approximation of Pantone 246 (hereafter "PC 246"); FIG. 20*c* shows a RED LED Reflective Intensity (or a combination of LEDS to achieve the red reflective distribution); FIG. 20*d* shows the reflected light of the Pantone 246 when illuminated with the Red LED of FIG. 20*c*, in terms of wavelength; and FIG. 20*e* shows the reflected light of the PC 246 when illuminated with the Red LED of FIG. 20*c*, in terms of wavelength. When using a Modulation Contrast formula defined by: (Lmax−Lmin)/(Lmax+Lmin), wherein Lmax is maximum reflected light (i.e., as shown in FIGS. 20*d* and 20*e*), and Lmin is minimum reflected light (i.e., as shown in FIGS. 20*d* and 20*e*), we obtain for this example a modulation contrast for the original of 0.082611836; and a modulation contrast for a counterfeit of 0.307930841, with an original to counterfeit ratio of 3.72744216. The reflected light values in this simulation are shown in the table of FIG. 20f.).

Fragile Watermark Detected with Selective Illumination

We provide a fragile watermark in a second example to further illustrate these illumination techniques. A watermark signal is laid down in an original with a first spot color ink or dye. The watermark is preferably detectable in the original when illuminated with corresponding or matched light. The watermark is undetected (or at least relatively subtle in comparison to the original), however, in a process color counterfeit illuminated with the same light.

Figure 21A:
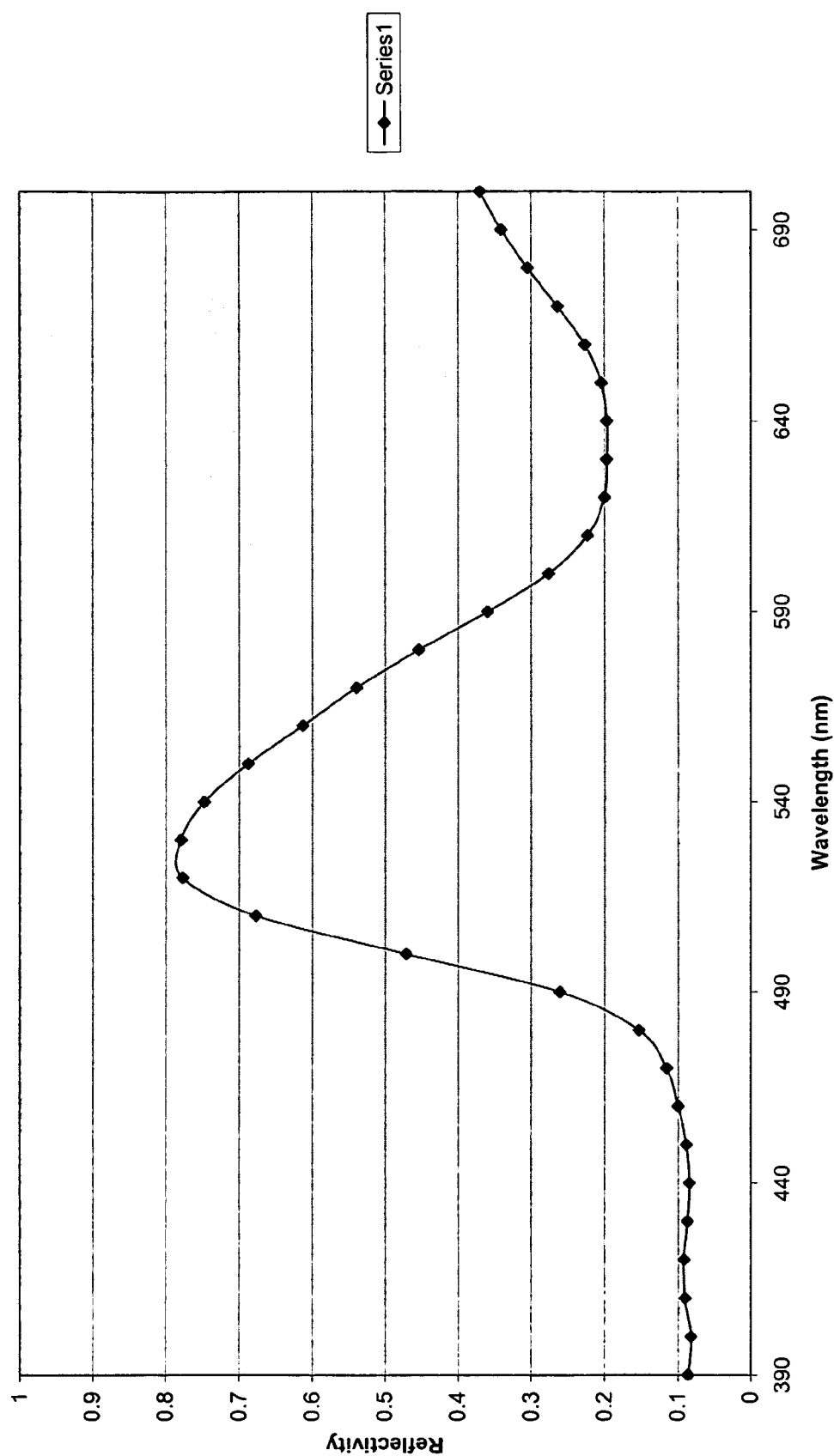
Figure 21B:
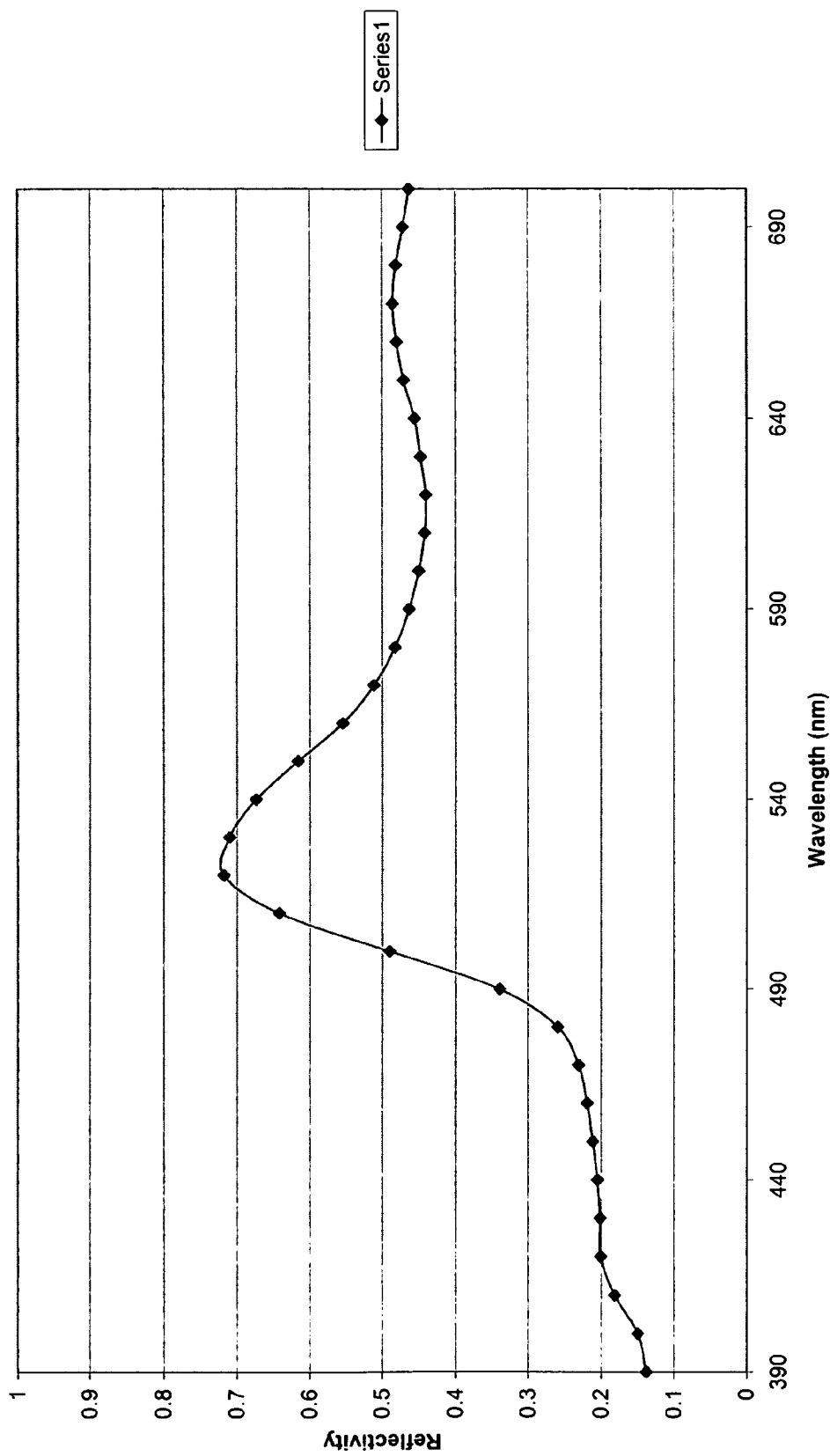
Figure 21C:
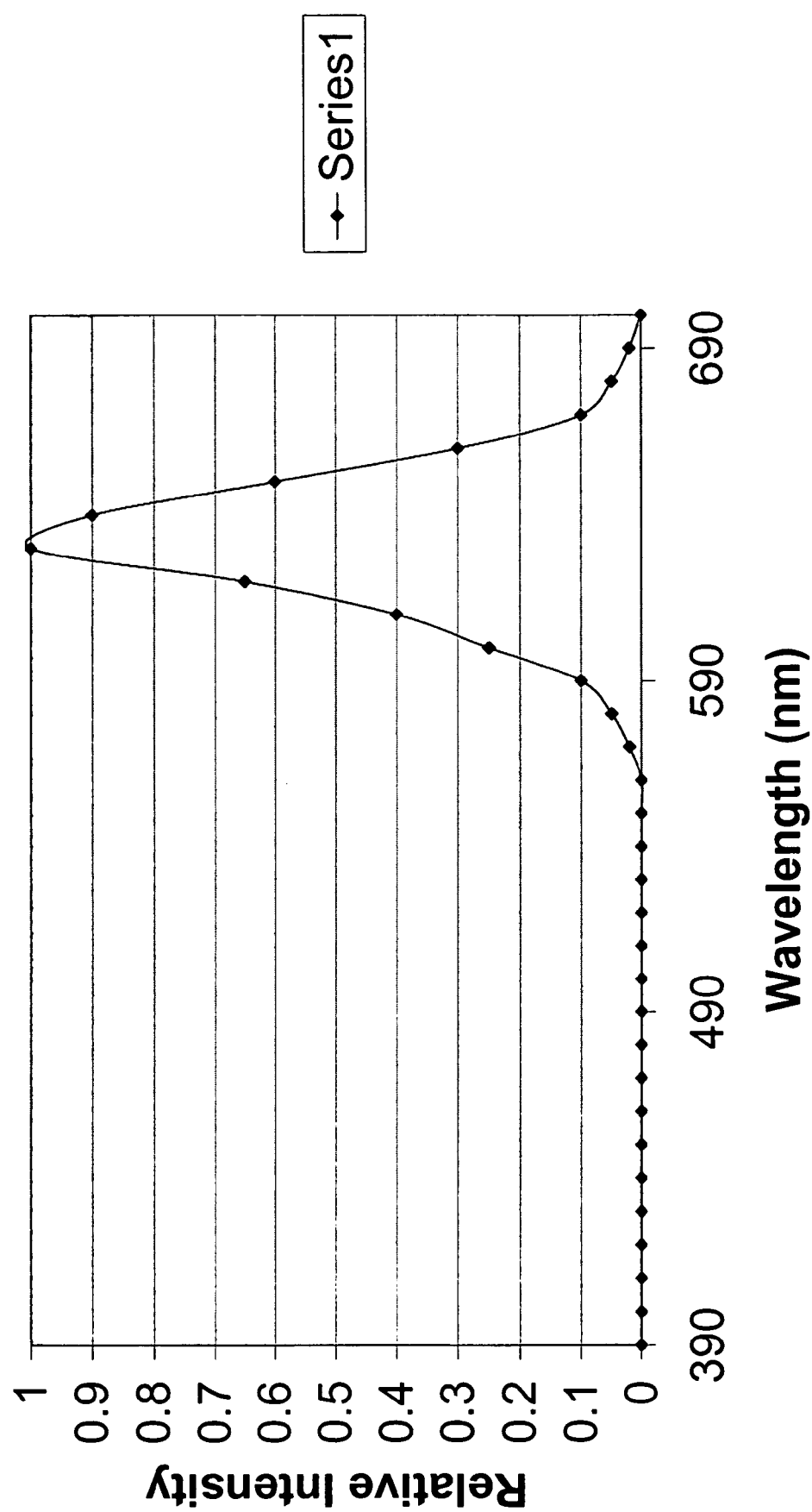
Figure 21D:
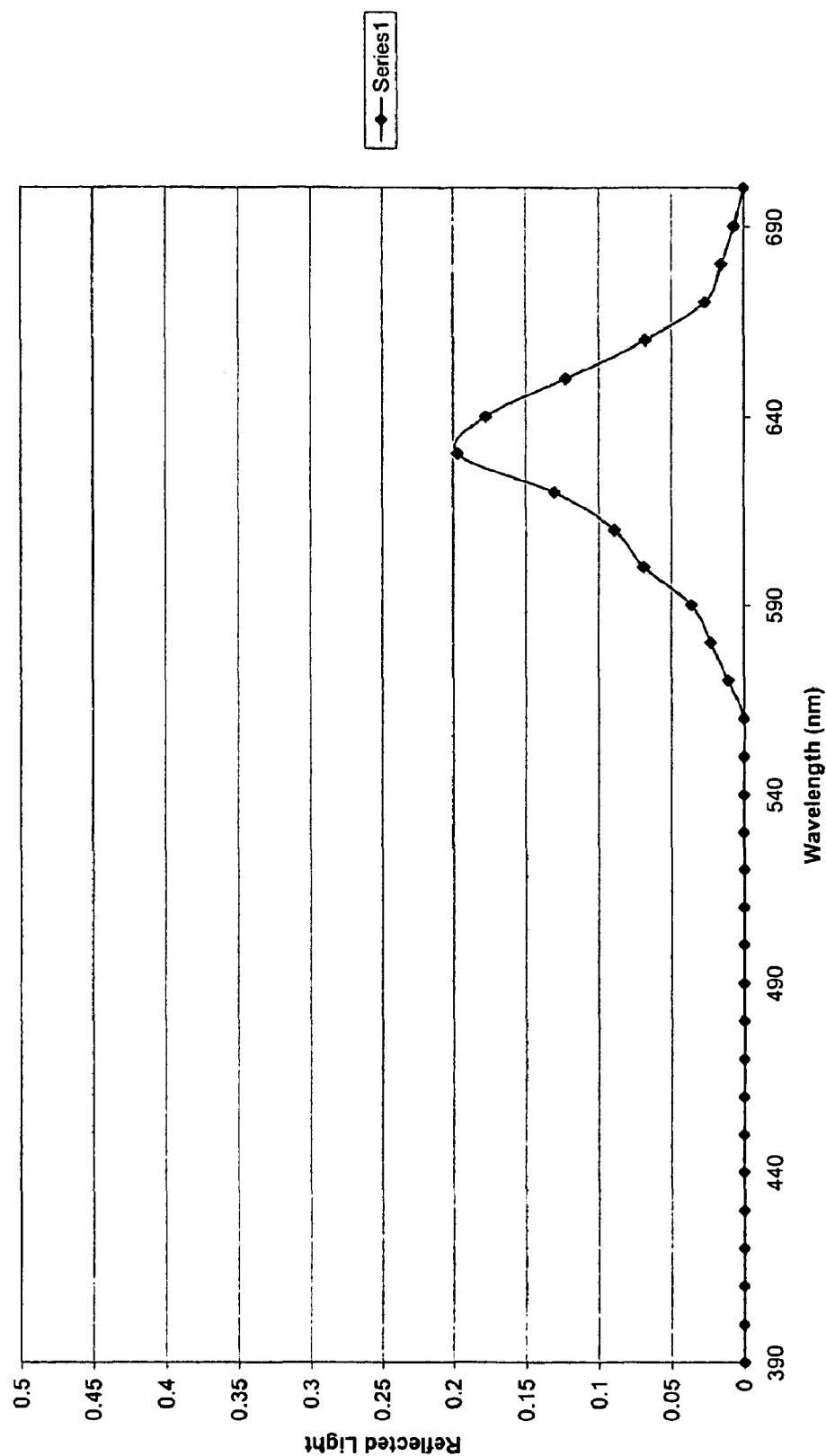
Figure 21E:
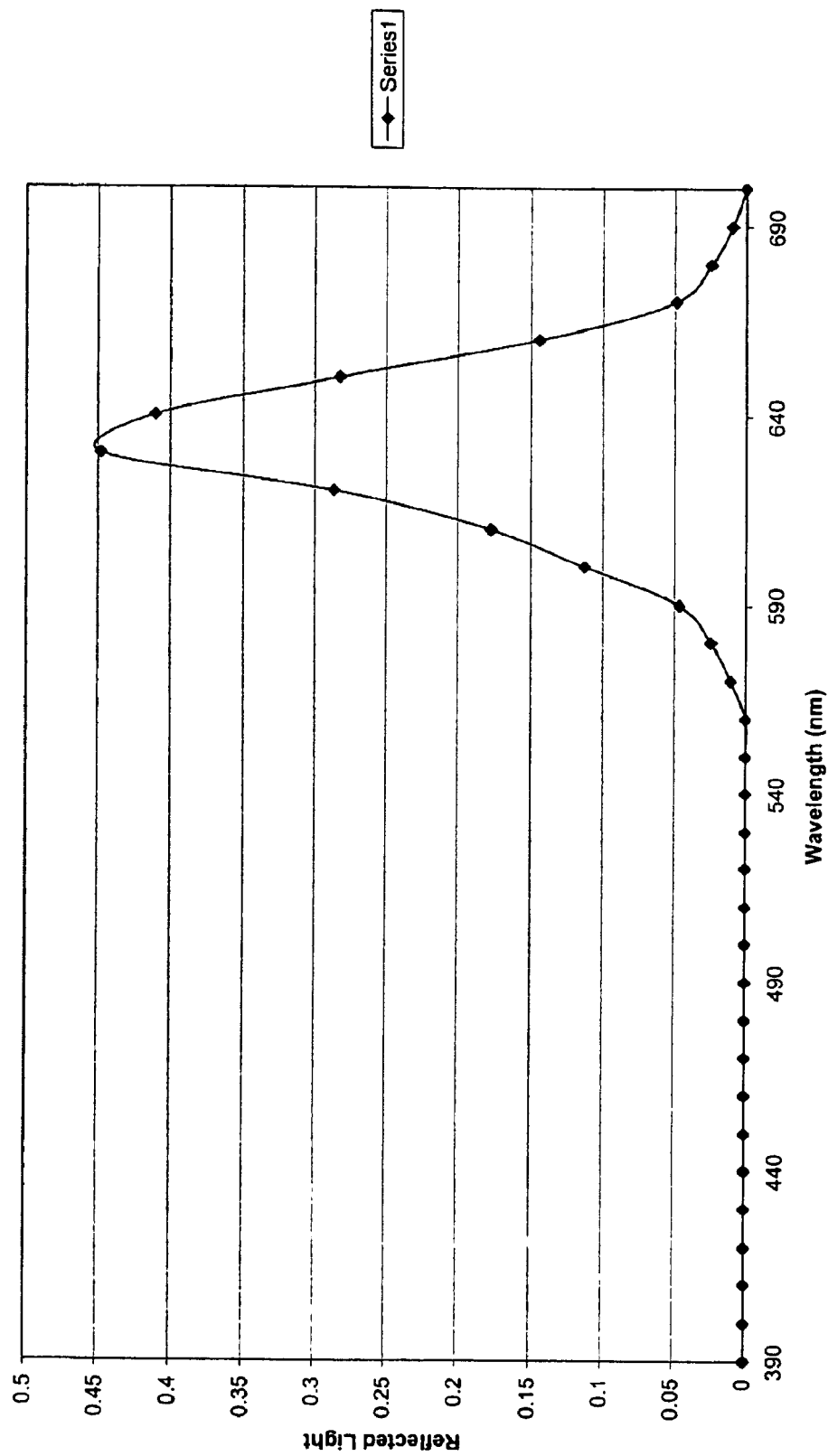

(FIGS. 21a-21g provides a further illustrative example. FIG. 21a shows the spectral response of Pantone 7488; FIG. 21b shows a spectral response of a process color ("PC") approximation of Pantone 7488 (hereafter "PC 7488"); FIG. 21c shows a RED LED Reflective Intensity (or a combination of LEDS to achieve the red reflective distribution)—note that the red distribution approximates an inverse of the Pantone 7488 response in FIG. 21a; FIG. 21d shows the reflected light of the Pantone 7488 when illuminated with the Red LED of FIG. 21c, in terms of wavelength; and FIG. 21e shows the reflected light of the PC 7488 when illuminated with the Red LED of FIG. 21c, in terms of wavelength. When using a Modulation Contrast formula defined by: $(L_{max} - L_{min})/(L_{max} + L_{min})$, wherein $L_{max}$ is maximum reflected light (i.e., as shown in FIGS. 21d and 21e), and $L_{min}$ is minimum reflected light (i.e., as shown in FIGS. 21d and 21e), we obtain for this example a modulation contrast for the original of 0.641314717; and a modulation contrast for a counterfeit of 0.373793097, with an original to counterfeit ratio of 1.715694384. The reflected light values in this simulation are shown in the table of FIG. 21f.).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patent documents referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

It should be appreciated that while specific notch filters have been discussed, the present invention is not so limited. Other filters and emphasizers can be suitable interchanged with the invention. For example, we envision a notch filter including two or more notches, with each of the notches being matched to a particular spectral response of a color. Also, while we have provided specific spot color examples, there are many, many other spot colors that can be suitably interchanged with the present invention. We can obtain matched or interference filters (or illumination) for these other colors as well.

The particular combinations of elements and features in the above-detailed embodiments are exemplary only; the interchanging and substitution of these teachings with other teachings in this and the incorporated-by-reference patents/applications are also contemplated.

We claim:

1. A method comprising:
imaging a printed object with an emphasizer including transmission characteristics, wherein the printed object comprises a first machine readable auxiliary signal conveyed with a first color including a spectral response that is inversely related to the transmission characteristics of the emphasizer, the printed object further comprising a second machine readable auxiliary signal embedded therein, wherein the second machine readable auxiliary signal is conveyed with a second color including a spectral response that corresponds to the transmission characteristics of the emphasizer, wherein the first color comprises a first spot color and the second color comprises a second, different spot color;
based on the detection of at least one of the first machine-readable auxiliary signal or the second machine-readable auxiliary signal, determining whether the printed object is a copy or an original.

2. The method of claim 1, wherein the printed object is determined to be an original when the first machine-readable auxiliary signal is detectable at a predetermined level.

3. The method of claim 1, wherein the printed object is determined to be a copy when the second machine-readable auxiliary signal is detectable at a predetermined level.

4. The method of claim 1, wherein the printed object is determined to be an original when the first machine-readable auxiliary signal is detectable at a predetermined level, and the second machine-readable auxiliary signal is at least one of undetectable or detectable but below a predetermined threshold.

5. The method of claim 1, wherein a copy is produced through an operation that approximates each of the first spot color and the second spot color with process color inks.

6. The method of claim 5, wherein the emphasizer comprises an interference filter.

7. The method of claim 5, wherein the emphasizer comprises selective illumination.

8. The method of claim 5, wherein the emphasizer comprises a color contrast enhancer.

9. A method comprising:
emphasizing contrast of a first spot color and a second spot color relative to a white background in an image captured of a printed object, wherein the act of emphasizing renders either the first spot color or the second spot color visually imperceptible relative to the white background in the image; and
based on a detection reading of at least one of a first machine-readable auxiliary signal conveyed with a first color or a second machine-readable auxiliary signal conveyed with a second color, determining whether the image corresponds to an image of an original printed object or copy of the original printed object.

10. A method comprising:
emphasizing contrast of a first color and second color relative to a white background in an image captured of a printed object, wherein the first color comprises a first spot color and the second color comprises a second spot color; and
based on a detection reading of at least one of a first machine-readable auxiliary signal conveyed with a first color or a second machine-readable auxiliary signal conveyed with a second color, determining whether the image corresponds to an image of an original printed object or copy of the original printed object.

11. A method comprising:
emphasizing contrast of a first color and second color relative to a white background in an image captured of a printed object; and
based on a detection reading of at least one of a first machine-readable auxiliary signal conveyed with a first color or a second machine-readable auxiliary signal conveyed with a second color, determining whether the image corresponds to an image of an original printed object or a copy of the original printed object, wherein the copy is made by a process color approximation of a first spot color and a second spot color, with at least one of the first spot color and the second spot color being out of gamut with respect to the process color inks.

12. The method of claim 11, wherein the first spot color is out of gamut, and wherein the contrast of the first spot color is emphasized so that the first machine-readable auxiliary signal is less detectable in an original in comparison to the process color ink approximation of the first auxiliary signal in a copy.

13. The method of claim 12, wherein the second spot color is also out of gamut, and wherein the contrast of the second spot color is emphasized so that the second machine-readable auxiliary signal is more detectable in the original in comparison to a similarly emphasized process color ink approximation of the second auxiliary signal in a copy.

14. A method comprising:
determining whether at least one of a first machine readable auxiliary signal and a second machine readable auxiliary signal is embedded in an image, wherein the first auxiliary signal is conveyed using a first color and the second auxiliary signal is conveyed using a second color, the first and second colors being represented differently in response to a copy operation, the different representation providing a divergence or convergence of a characteristic of the colors such that the machine readable signals becomes more or less detectable, wherein the first color comprises a first spot color, and the second color comprises a second spot color; and
based on evaluating the machine-readable auxiliary signals, determining whether the printed object is a copy or an original, wherein the copy operation comprises a first approximation of the first spot color with process color inks and a second approximation of the second spot color with process color inks.

15. The method of claim 14, wherein the characteristic comprises relative contrast.

16. The method of claim 15, wherein the first approximation provides enhanced contrast convergence in comparison to the first spot color when imaged with a filter that is matched to the spectral response of the first spot color.

17. The method of claim 15, wherein the first approximation provides enhanced contrast convergence in comparison to the first spot color when image with illumination that is matched to the spectral response of the first spot color.

18. The method of claim 16, wherein the second approximation provides contrast divergence relative to the second spot color when imaged with a filter that is inversely matched to the spectral response of the second spot color.

19. The method of claim 16, wherein the second approximation provides contrast divergence relative to the second spot color when imaged with illumination that is inversely matched to the spectral response of the second spot color.

* * * * *

UNITED STATES PATENT AND TRADEMARK OFFICE
CERTIFICATE OF CORRECTION

PATENT NO. : 8,094,869 B2
APPLICATION NO. : 10/836094
DATED : January 10, 2012
INVENTOR(S) : Reed et al.

It is certified that error appears in the above-identified patent and that said Letters Patent is hereby corrected as shown below:

Page 4, item (56), under "Other Publications", in Column 2, Line 7, delete "IEE" and insert -- IEEE --.

Page 4, item (56), under "Other Publications", in Column 2, Line 19, delete "Battialo" and insert -- Battiato --.

Page 5, item (56), under "Other Publications", in Column 1, Line 17, delete "Watermaking" and insert -- Watermarking --.

Column 16, line 19, in Claim 1, delete "color;" and insert -- color; and --.

Signed and Sealed this
Fifth Day of June, 2012

David J. Kappos
*Director of the United States Patent and Trademark Office*